US010969295B2

(12) United States Patent
Furuichi et al.

(10) Patent No.: US 10,969,295 B2
(45) Date of Patent: Apr. 6, 2021

(54) FIXING STRUCTURE FOR ELECTRONIC DEVICE AND WATER LEAKAGE DETECTOR

(71) Applicant: HITACHI, LTD., Tokyo (JP)

(72) Inventors: Hiroaki Furuichi, Tokyo (JP); Hiroyuki Oota, Tokyo (JP); Tomonori Sekiguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 344 days.

(21) Appl. No.: 16/133,125

(22) Filed: Sep. 17, 2018

(65) Prior Publication Data

US 2019/0250062 A1 Aug. 15, 2019

(30) Foreign Application Priority Data

Feb. 13, 2018 (JP) .............................. JP2018-023309

(51) Int. Cl.
*G01M 3/18* (2006.01)
*G01H 3/06* (2006.01)
*G01M 3/24* (2006.01)
*G01D 11/24* (2006.01)

(52) U.S. Cl.
CPC .............. *G01M 3/184* (2013.01); *G01D 11/24* (2013.01); *G01H 3/06* (2013.01); *G01M 3/243* (2013.01)

(58) Field of Classification Search
CPC ........ G01M 3/184; G01M 3/243; G01H 3/06; G01D 11/24
USPC ....................................................... 73/49.1
See application file for complete search history.

(56) References Cited

U.S. PATENT DOCUMENTS

| 5,616,829 A * | 4/1997 | Balaschak ............. F16K 31/046 137/551 |
| 6,125,868 A * | 10/2000 | Murphy ................... F16K 31/46 137/1 |
| 6,530,277 B2 * | 3/2003 | Kumpfmueller ... F16K 37/0083 73/168 |

(Continued)

FOREIGN PATENT DOCUMENTS

| JP | 10-340062 A | 12/1998 |
| JP | 10340062 A * | 12/1998 |
| JP | 2013-195173 A | 9/2013 |

OTHER PUBLICATIONS

Translation of JP-10340062-A (Year: 1998).*

*Primary Examiner* — Nathaniel T Woodward
(74) *Attorney, Agent, or Firm* — Volpe Koenig

(57) ABSTRACT

A sensor terminal includes: a vibration sensor; an L-shaped attachment main body portion on which the vibration sensor is mounted and that is detachably attached to a truncated quadrangular pyramid structure portion of a valve cap attached to an opening/closing shaft portion of a water regulating valve provided in a water service pipe; side surface magnets that are provided in the attachment main body portion; and an upper surface magnet that is attached to a lower surface of a base on which the vibration sensor is mounted. Further, the truncated quadrangular pyramid structure portion includes a quadrangular upper surface and four side surfaces, and the attachment main body portion of the sensor terminal is fixed using magnet to each of the upper surface of the truncated quadrangular pyramid structure portion and at least one side surface among the four side surfaces.

15 Claims, 14 Drawing Sheets

(56) References Cited

U.S. PATENT DOCUMENTS 9,423,050 B2 *  8/2016  Anderson ........... F16K 37/0083
9,528,901 B2 * 12/2016  Kiesbauer ........... G01M 3/2876

* cited by examiner

[FIG. 1]
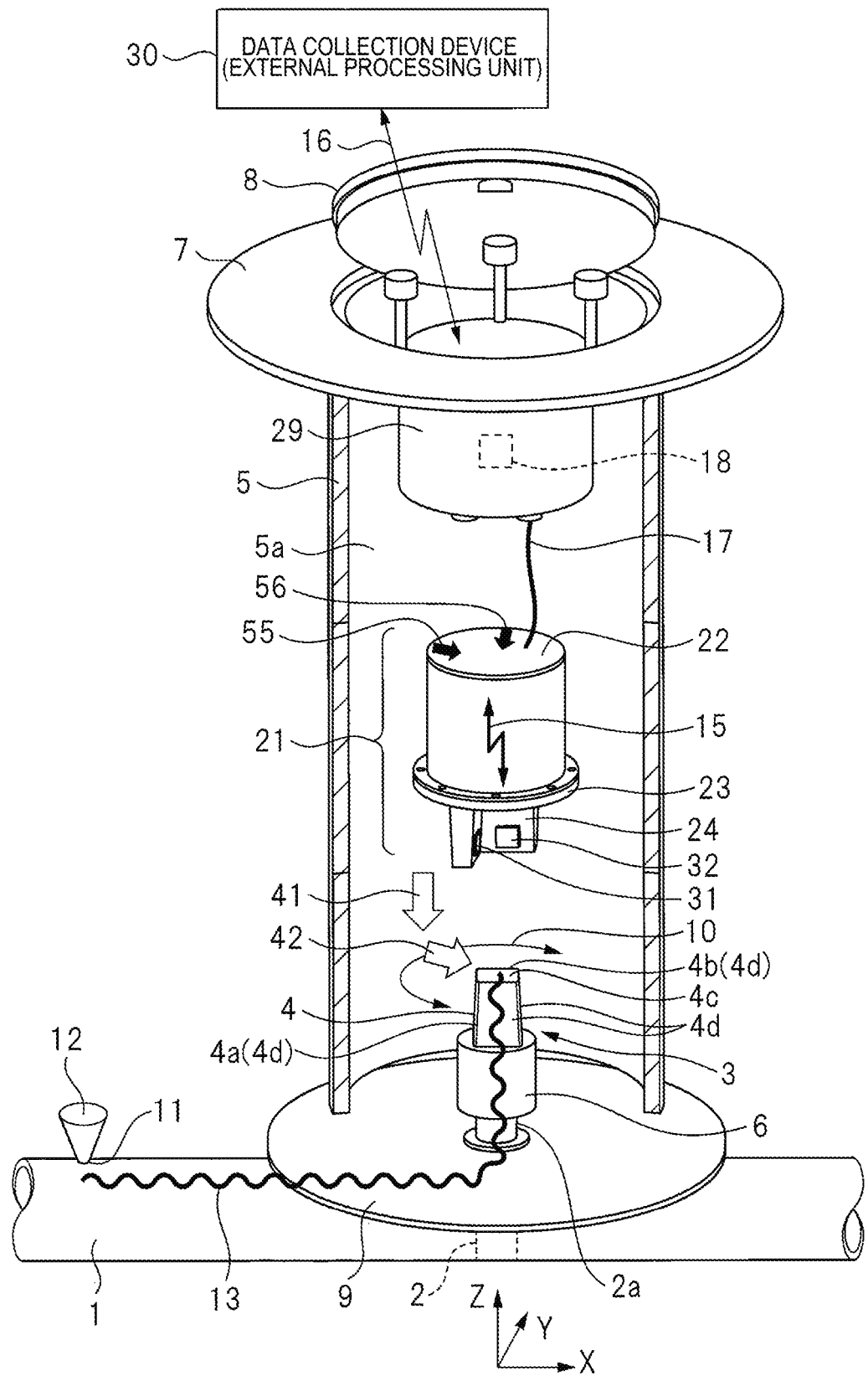

[FIG. 2]
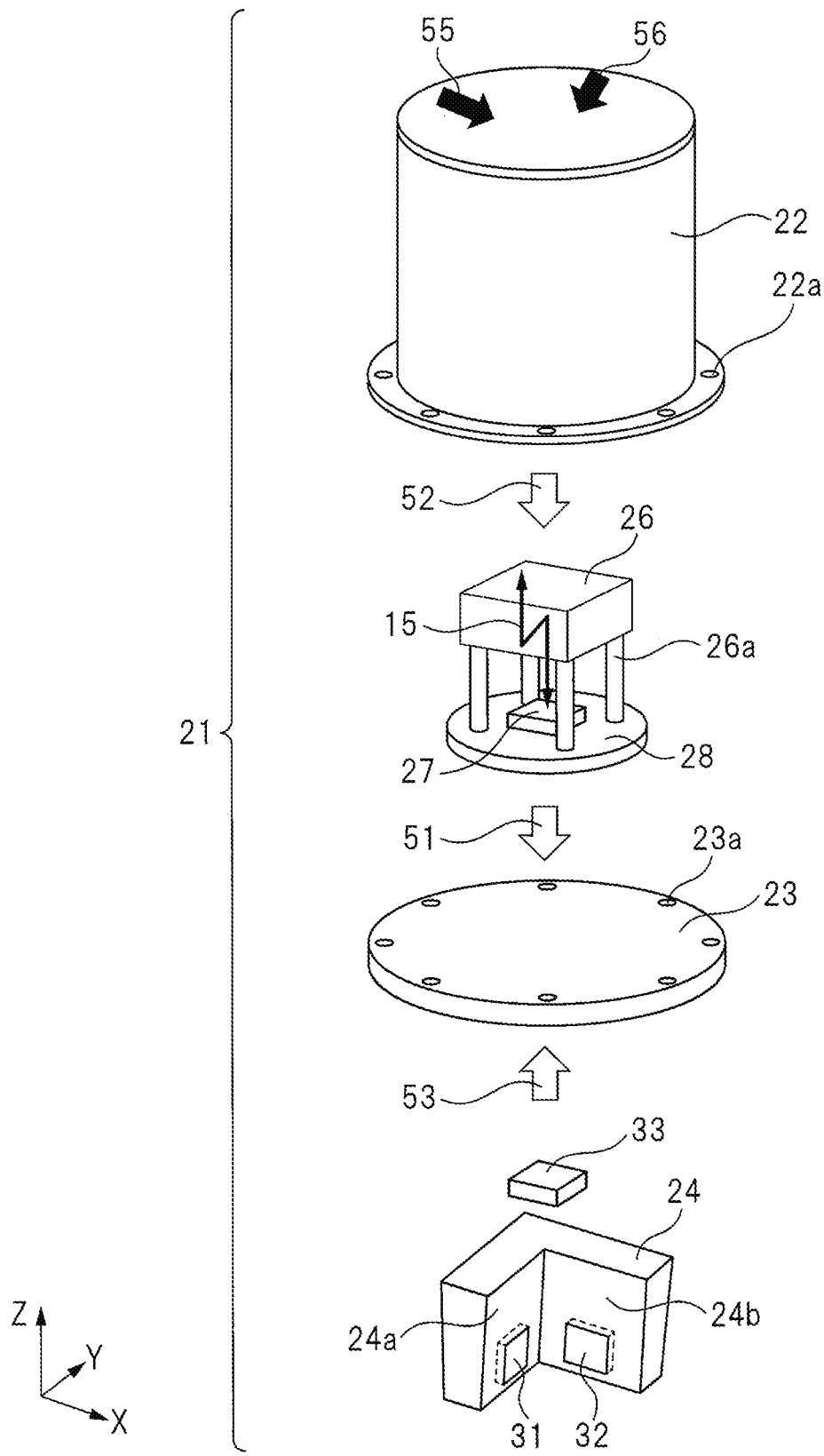

[FIG. 3]
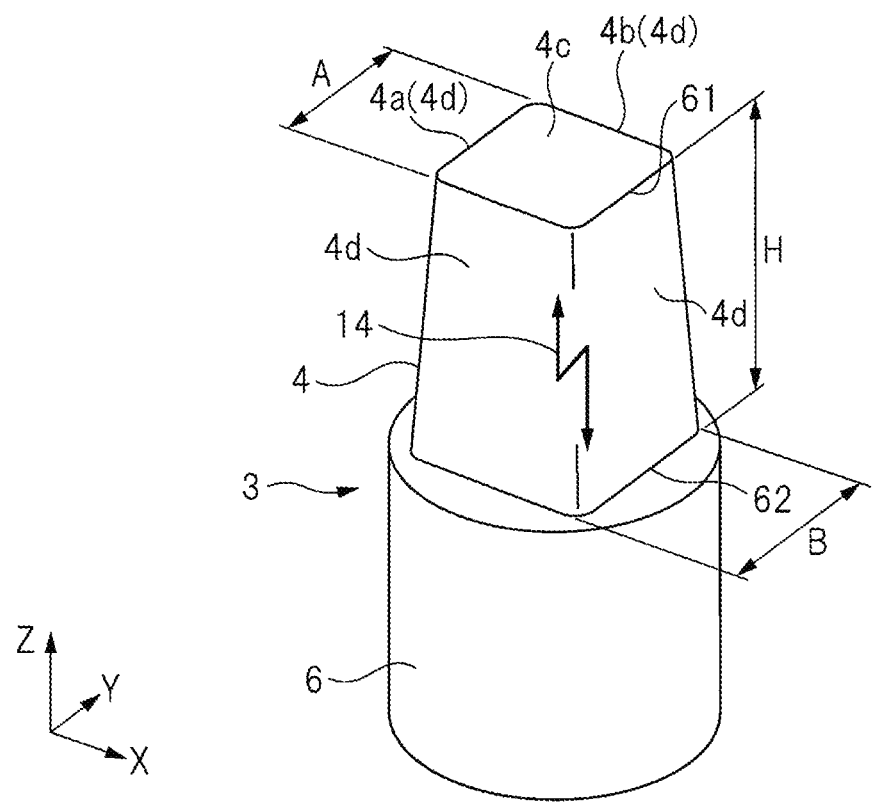

[FIG. 4]
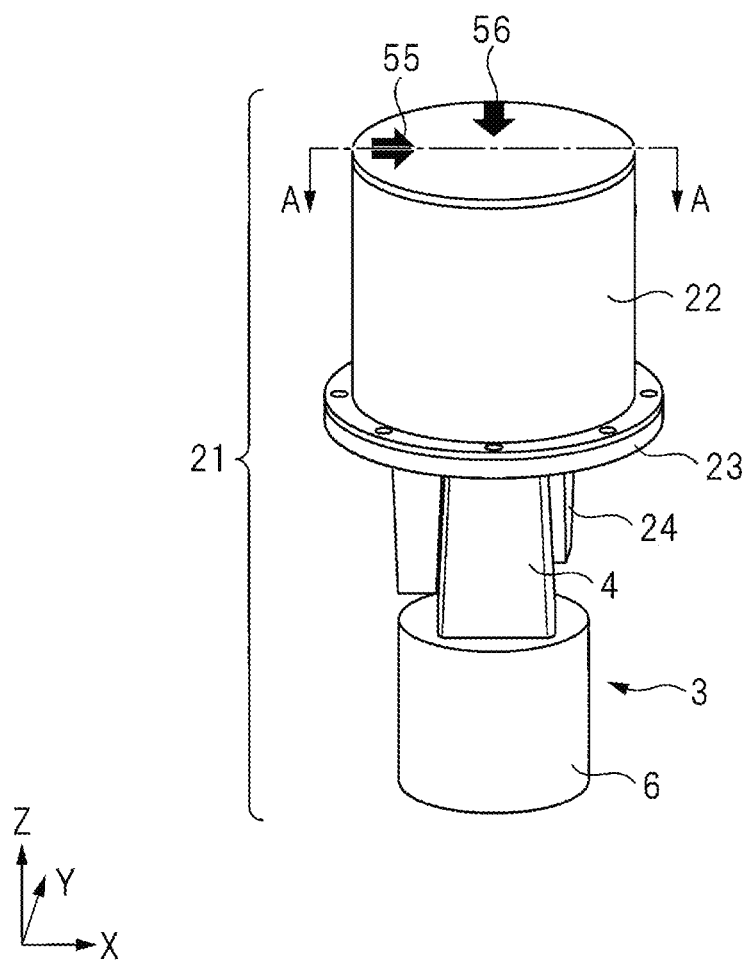

[FIG. 5]
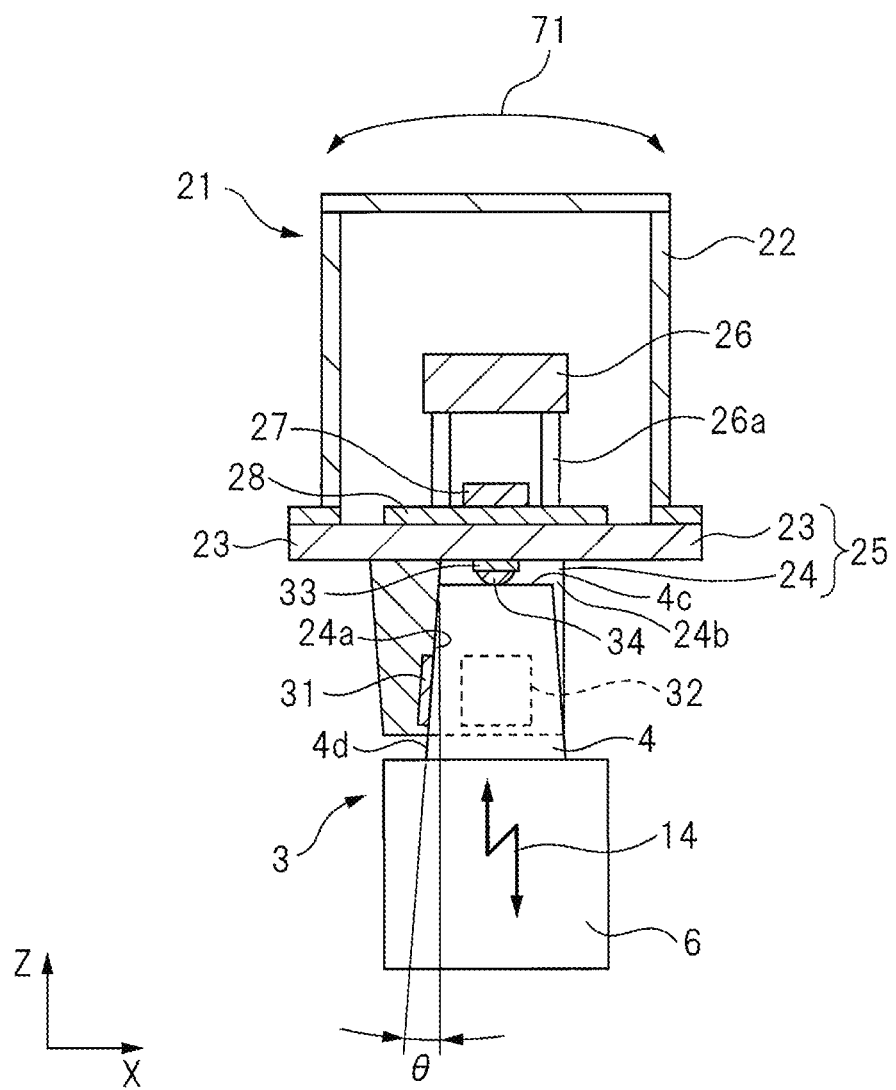

[FIG. 6]
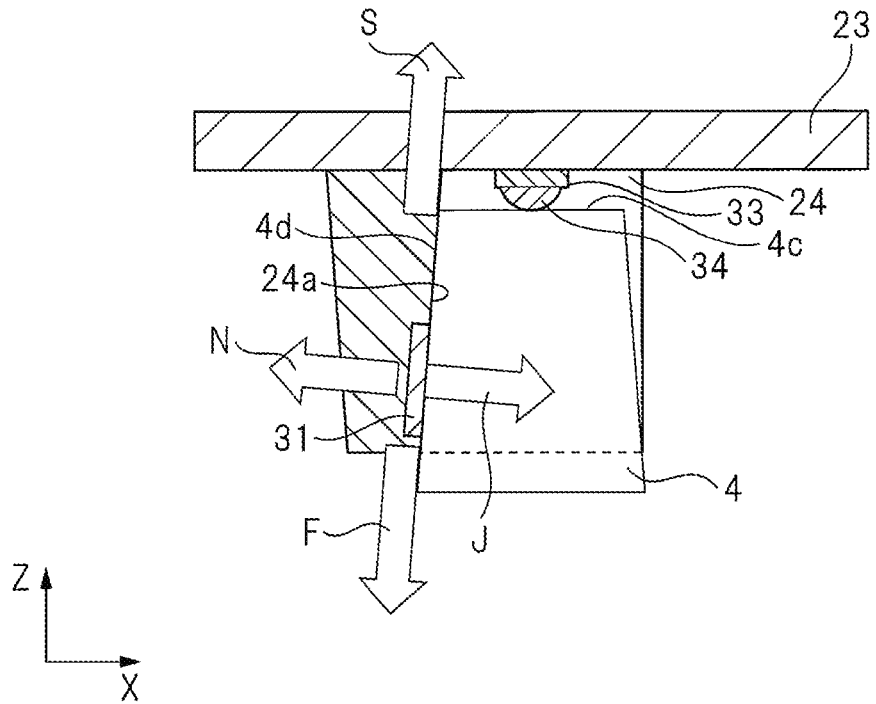
[FIG. 7]
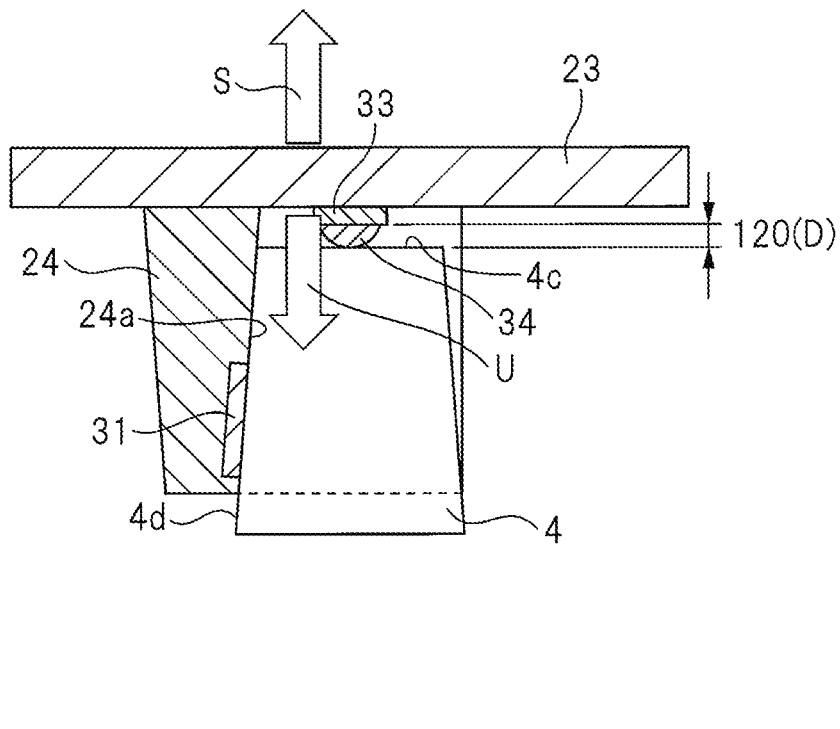

[FIG. 8]
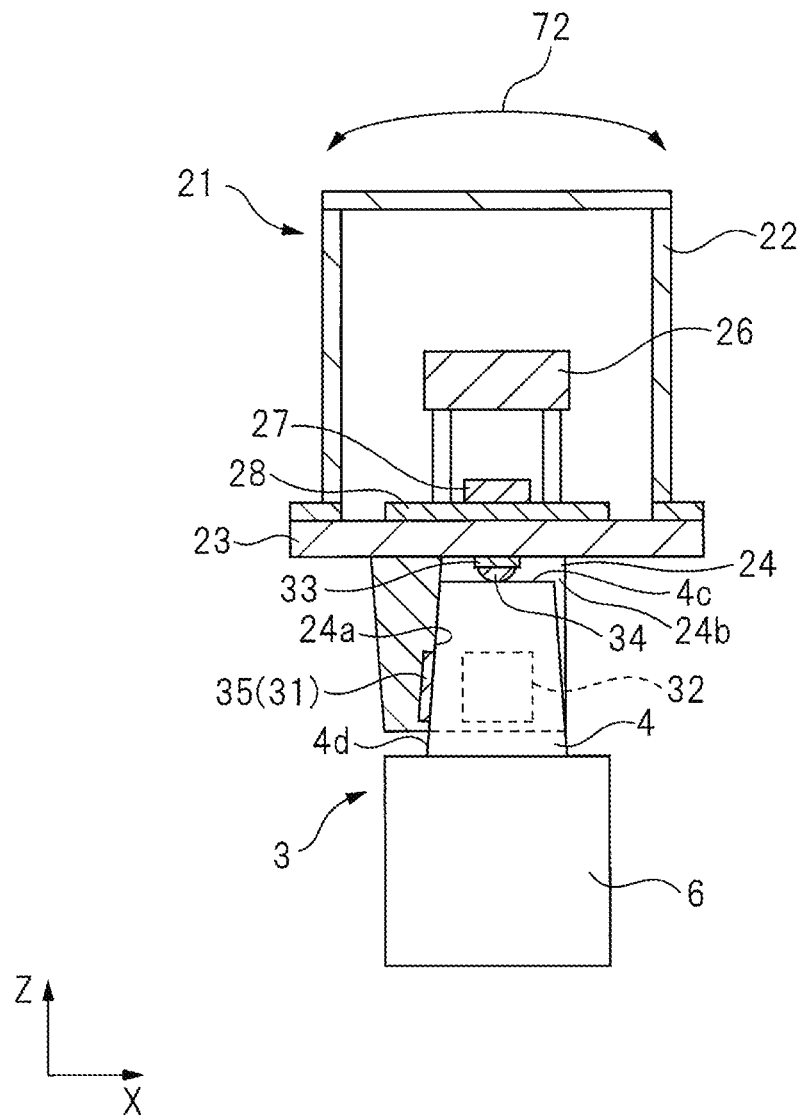

[FIG. 9]
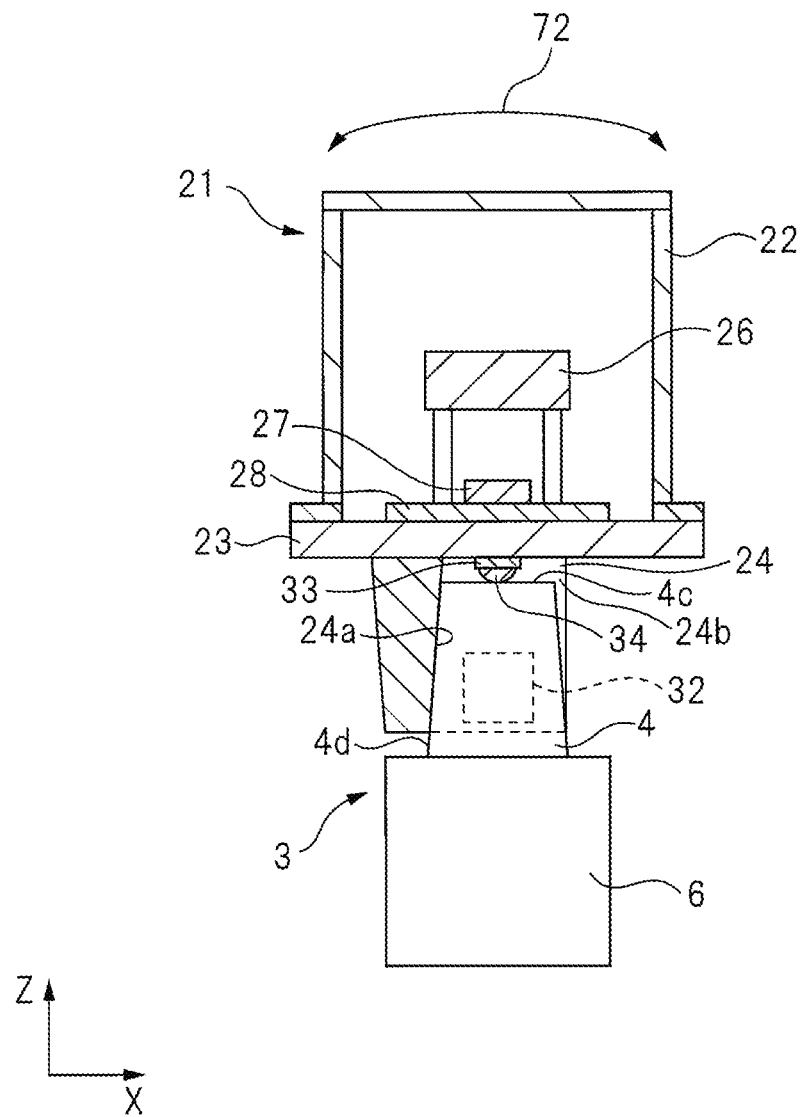

[FIG. 10]
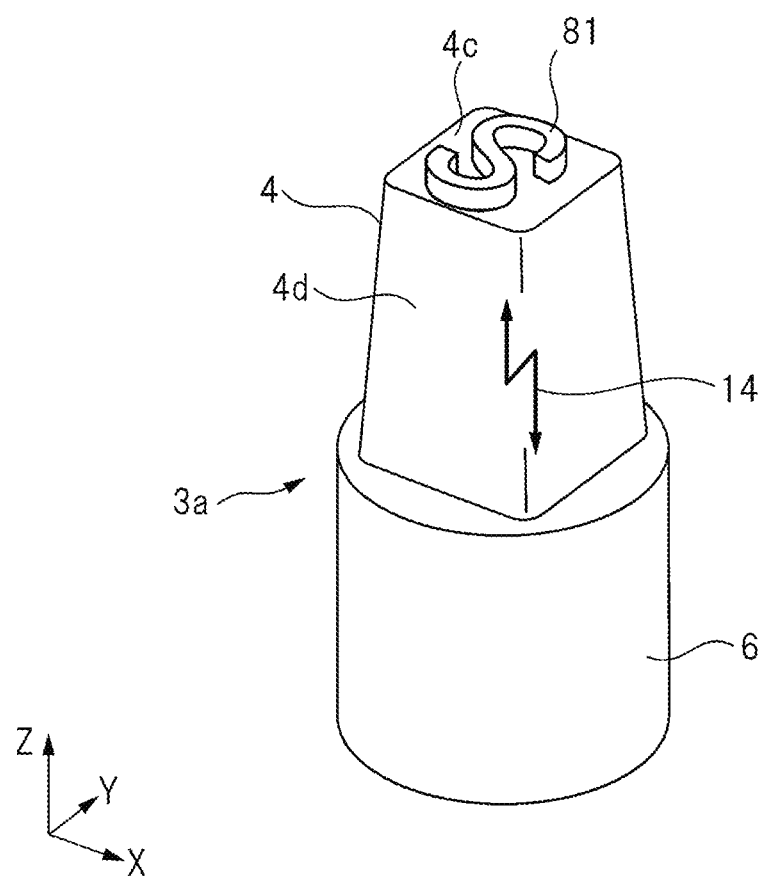

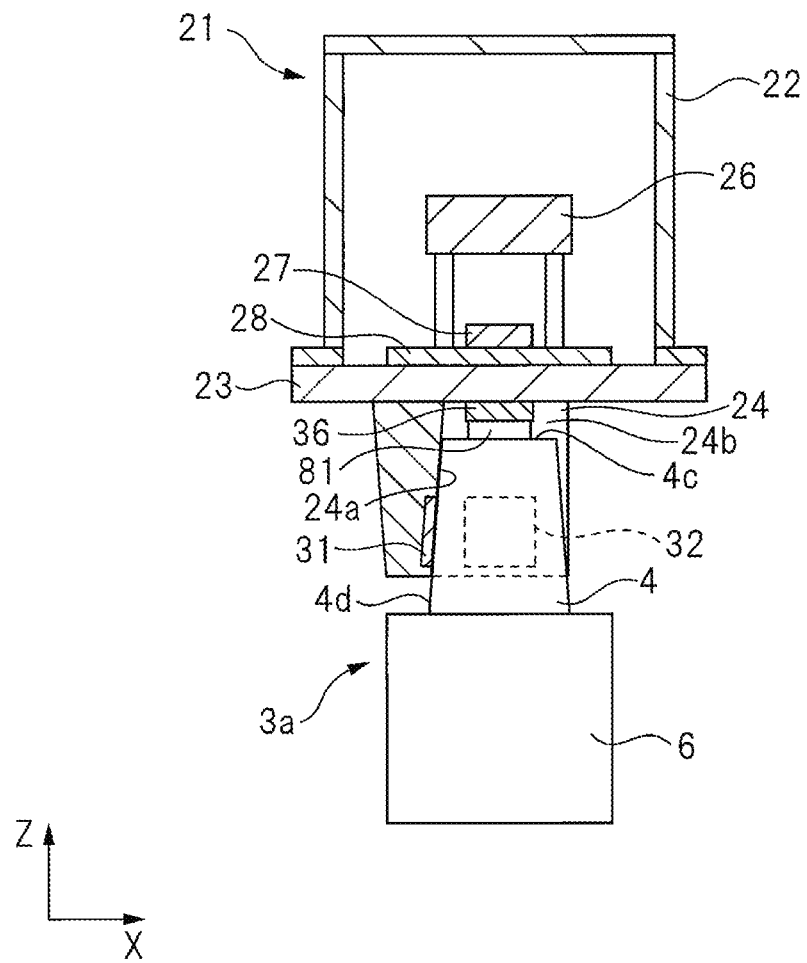
[FIG. 11]

[FIG. 12]
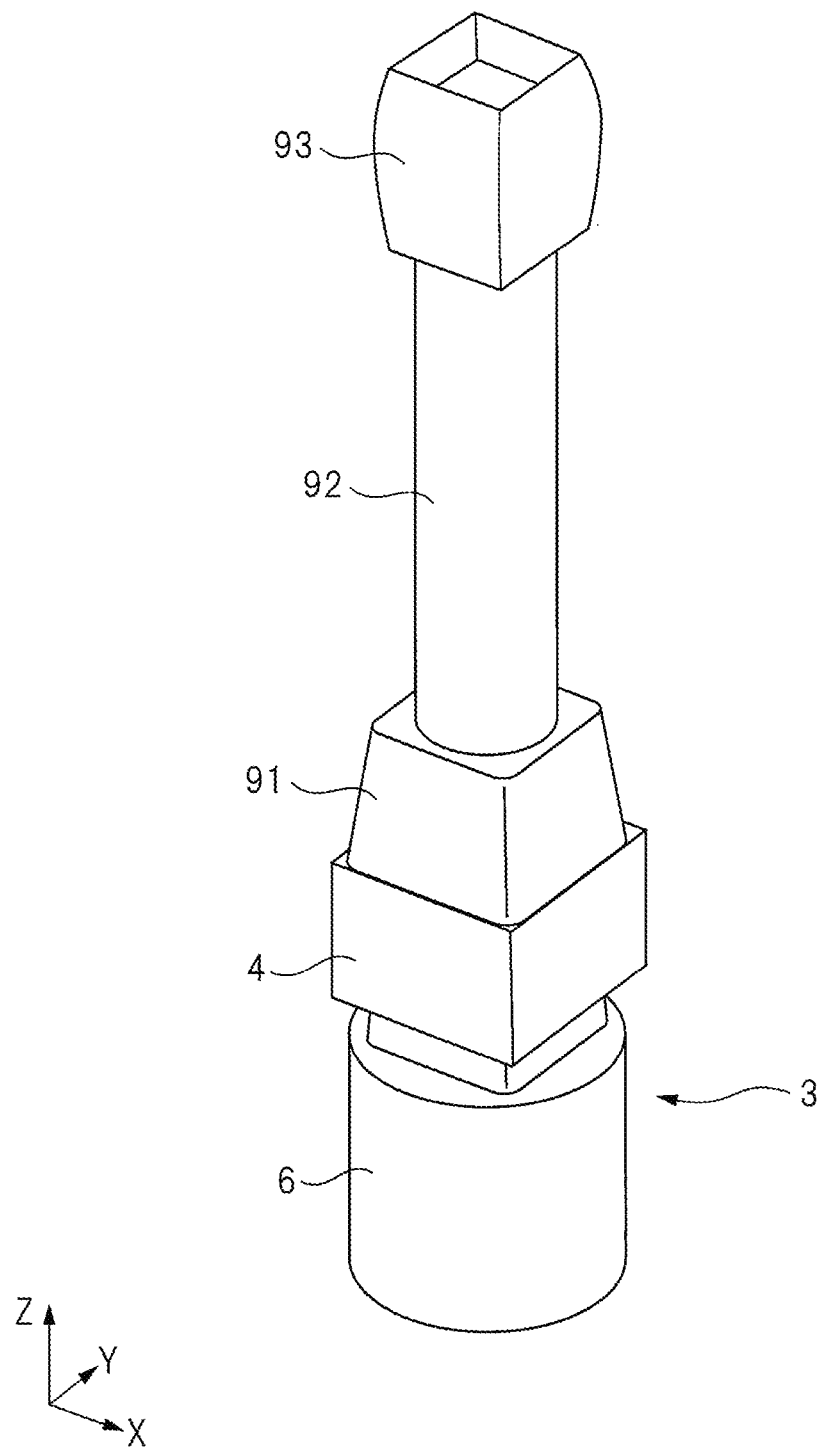

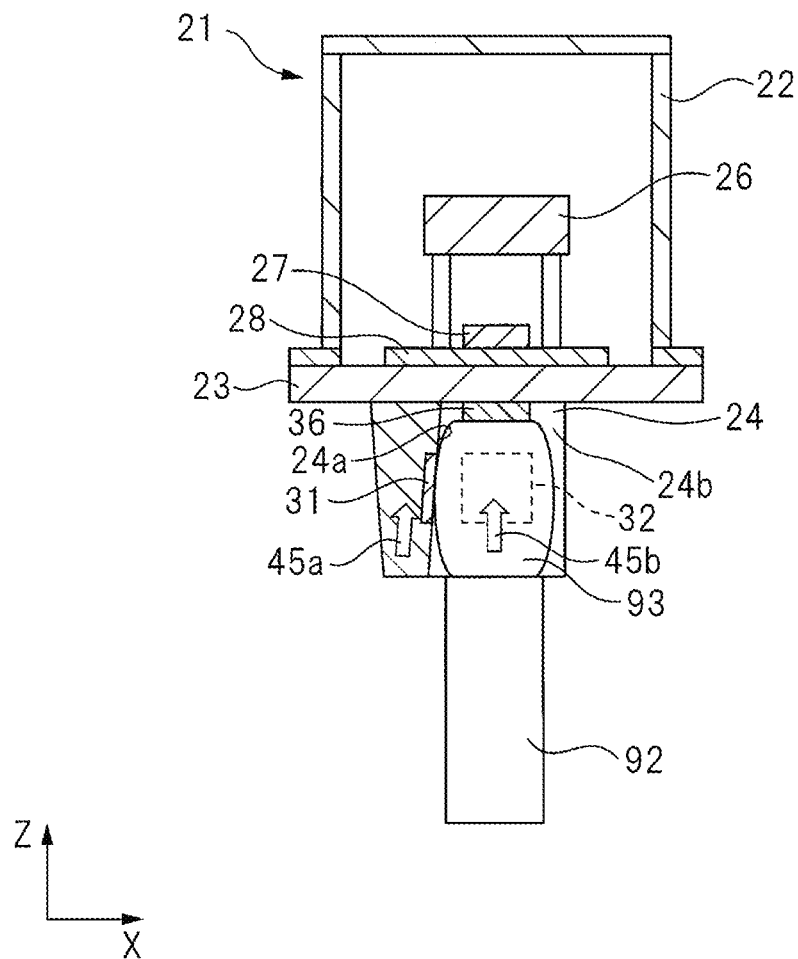
[FIG. 13]

[FIG. 14]
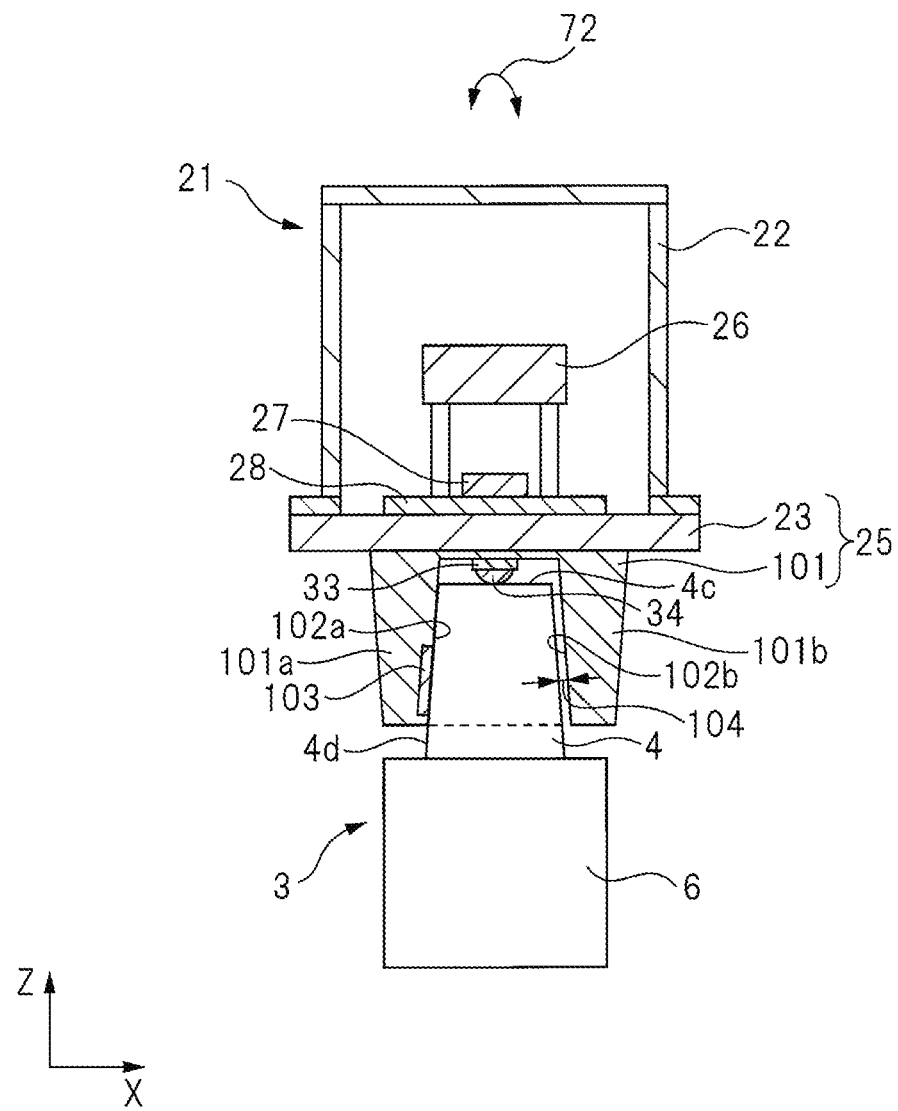

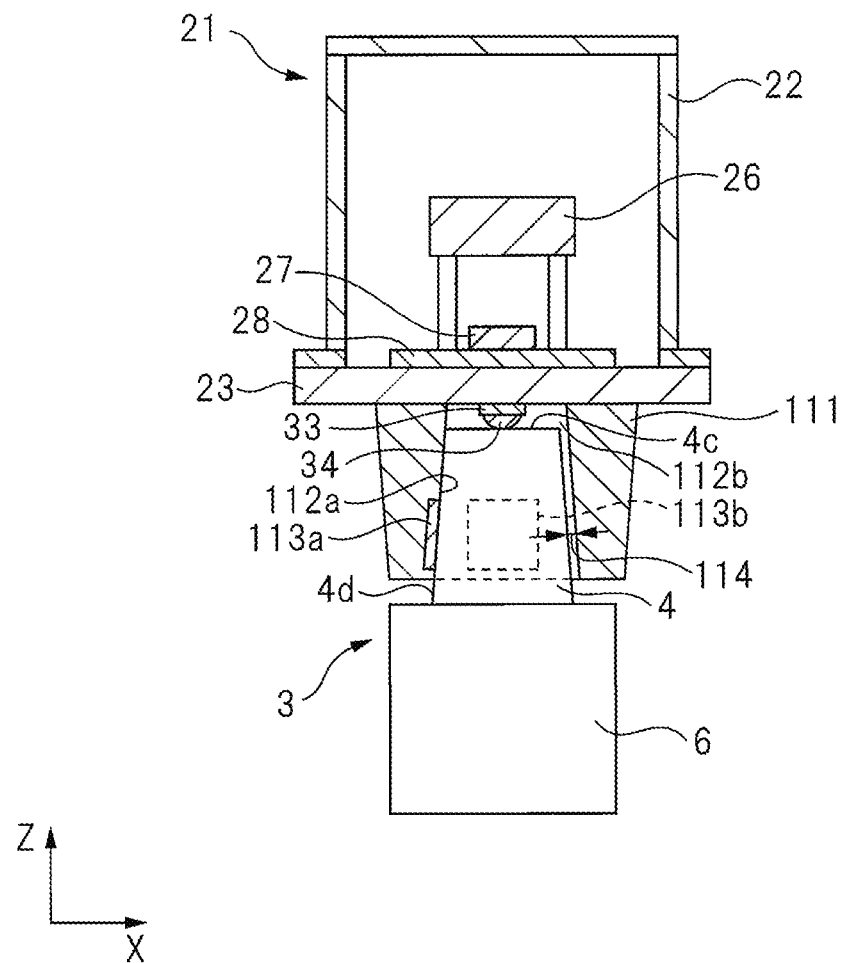
[FIG. 15]

FIXING STRUCTURE FOR ELECTRONIC DEVICE AND WATER LEAKAGE DETECTOR

TECHNICAL FIELD

The present invention relates to a fixing structure that fixes an electronic device on which a sensor or the like is mounted using a magnet, and a water leakage detector.

BACKGROUND ART

Regarding water leakage of a water pipe constructed underground, various methods of detecting the water leakage using vibration or sound generated by the water leakage are used. As a representative example, a method of bringing a leak sound detection bar into contact with a water regulating valve, a gate valve, a water stop valve, or the like for a worker to detect water leakage using sound is widely used. However, a detection range of water leakage vibration of the leak sound detection bar is in a low frequency band of about 200 Hz to 1 kHz. In addition, a method of detecting water leakage using a vibration sensor such as a piezoelectric element instead of a worker is also known.

In order to detect a position at which water leakage occurs in the water pipe constructed underground, it is necessary to install plural sensors for respective water regulating valves, and it is desired that an installation method thereof is simple. In addition, in order to expect the time when water leakage occurs, it is necessary to install the sensors stably for a long period of time.

For example, JP-A-10-340062 (PTL 1) discloses a structure of a water leakage detector where a vibration sensor is fixed using a magnet to a region immediately above a gate valve of a water service pipe.

In addition, as a structure in which an acceleration sensor is fixed to a measurement target without scratches or marks of an adhesive on the measurement target, JP-A-2013-195173 (PTL 2) discloses a structure in which an acceleration sensor is installed in a state where a magnet is made to enter a non-contact state using an adsorption force of the magnet and both leg portions are brought into contact with a measurement target.

CITATION LIST

Patent Literature

PTL 1: JP-A-10-340062
PTL 2: JP-A-2013-195173

SUMMARY OF INVENTION

Technical Problem

The fixing structure for a sensor using a magnet disclosed in PTL 1 (JP-A-10-340062) is a structure in which a vibration sensor is adsorbed using one magnet on a flat surface of an upper surface of a valve cap provided on a rotating shaft for opening and closing a gate valve. Therefore, when high external force (excitation) or moment is applied due to an earthquake or the like, an installation position of the sensor may be shifted, or the adsorption of the magnet may be released.

Further, when the upper surface of the valve cap is not a flat surface, the adsorption force of the magnet is insufficient, and there is also a problem in that stable vibration transmission cannot be performed.

In addition, in the structure disclosed in PTL 2 (JP-A-2013-195173), the both leg portions go around opposite sides and come into contact with the acceleration sensor and the target. Therefore, the acceleration sensor and the target are not in direct contact with each other with the shortest distance, and thus vibration of the target transmitted to the acceleration sensor may be attenuated or resonance of the both leg portions may be applied. As a result, vibration transmission characteristics may change.

An object of the invention is to provide a technique capable of fixing an electronic device stably for a long period of time and securing vibration transmission characteristics.

The object and new characteristics of the invention will be clarified with reference to description of the specification and the accompanying drawings.

Solution to Problem

The summary of a representative embodiment disclosed in the present application will be simply described as follows.

According to one embodiment, there is provided a fixing structure for an electronic device including an electronic device, an attachment portion on which the electronic device is mounted and which is detachably attached to a truncated quadrangular pyramid structure portion of a valve cap attached to a rotating operation unit for opening and closing a water regulating valve provided in a water service pipe, and a magnet that is provided in the attachment portion. The truncated quadrangular pyramid structure portion includes a quadrangular upper surface and four side surfaces connected to the upper surface, and the attachment portion is fixed using the magnet to each of the upper surface of the truncated quadrangular pyramid structure portion and at least one side surface among the four side surfaces of the truncated quadrangular pyramid structure portion.

In addition, according to one embodiment, there is provided a water leakage detector including an electronic device, an attachment portion on which the electronic device is mounted and which is detachably attached to a truncated quadrangular pyramid structure portion of a valve cap attached to a rotating operation unit for opening and closing a water regulating valve provided in a water service pipe, and a magnet that is provided in the attachment portion. The water leakage detector further includes a transceiver that includes an antenna and exchanges information included in the electronic device through the antenna, and an external processing unit that transmits and receives signals to and from the transceiver and executes a process based on the signals transmitted from the transceiver. The truncated quadrangular pyramid structure portion includes a quadrangular upper surface and four side surfaces connected to the upper surface, and the attachment portion is fixed using the magnet to each of the upper surface of the truncated quadrangular pyramid structure portion and at least one side surface among the four side surfaces of the truncated quadrangular pyramid structure portion.

Advantageous Effects of Invention

The summary of an effect obtained by the representative embodiment of the invention disclosed in the present application will be simply described as follows.

Even when high external force is applied due to an earthquake or the like, a sensor can be fixed stably for a long period of time, and vibration transmission characteristic can be secured.

BRIEF DESCRIPTION OF DRAWINGS

FIG. 1 is a partially exploded perspective view illustrating a fixing structure for an electronic device according to Embodiment 1 of the invention and an example of a usage state thereof.

FIG. 2 is a perspective view illustrating an example of an assembly procedure of a sensor terminal illustrated in FIG. 1.

FIG. 3 is a perspective view illustrating an example of a shape of a valve cap of a gate valve (water regulating valve) illustrated in FIG. 1.

FIG. 4 is a perspective view illustrating a state where the sensor terminal illustrated in FIG. 2 is attached to the valve cap.

FIG. 5 is a cross-sectional view illustrating a structure taken along line A-A of FIG. 4.

FIG. 6 is a cross-sectional view illustrating adsorption force of an inner wall surface of an attachment main body portion of the sensor terminal illustrated in FIG. 5.

FIG. 7 is a cross-sectional view illustrating adsorption force of an upper surface magnet attached to a base of the sensor terminal illustrated in FIG. 5.

FIG. 8 is a cross-sectional view illustrating an example of a structure of a fixing structure for an electronic device according to Embodiment 2 of the invention in which one side surface magnet is smaller than another side surface magnet.

FIG. 9 is a cross-sectional view illustrating an example of a structure of a fixing structure for an electronic device according to Embodiment 3 of the invention in which one side surface magnet is removed.

FIG. 10 is a perspective view illustrating a shape of a valve cap for a soft seal gate valve according to Embodiment 4 of the invention.

FIG. 11 is a cross-sectional view illustrating an example of a fixing structure for an electronic device according to Embodiment 4 of the invention in which a positioning pin of an upper surface is removed and the size of a magnet is increased.

FIG. 12 is a perspective view illustrating an example of a shape of an extension bar connected to the valve cap according to Embodiment 5 of the invention.

FIG. 13 is a cross-sectional view illustrating an example of a structure of a fixing structure for an electronic device according to Embodiment 5 of the invention in which a positioning pin of an upper surface is removed, the size of a magnet is increased, and positions of side surface magnets are shifted upward.

FIG. 14 is a cross-sectional view illustrating an example of a structure of a fixing structure for an electronic device according to Embodiment 6 of the invention in which portions to which a side surface magnet is attached to face each other in the form of two parallel lines.

FIG. 15 is a cross-sectional view illustrating an example of a structure of a fixing structure for an electronic device according to Embodiment 7 of the invention in which portions to which side surface magnets are attached are formed to surround four side surfaces.

DESCRIPTION OF EMBODIMENTS

Embodiment 1

FIG. 1 is a partially exploded perspective view illustrating a fixing structure for an electronic device according to Embodiment 1 of the invention and an example of a usage state thereof.

Hereinafter, the fixing structure for an electronic device according to Embodiment 1 will be described. First, a water pipe-laying configuration of a water leakage detection target according to Embodiment 1 illustrated in FIG. 1 will be described. In a water pipe (pipe) 1 constructed underground, gate valves (also referred to as "water regulating valves" or "water stop valves") 2 that allows or stops the flow of water are installed at an interval of several tens to several hundreds of meters (buried in a ground 9). Each of the gate valves 2 installed at an interval of several tens to several hundreds of meters is installed in a hole 5a of a valve box 5. In an upper portion of the valve box 5, the hole 5a is open to a ground surface 7, and the opening portion of the upper portion of the valve box 5 is closed with a lid 8 of a manhole or the like. That is, when the lid 8 of the valve box 5 is opened, the vertical hole 5a in the valve box 5 can be seen.

When the inside of the vertical hole 5a of the valve box 5 is observed from the ground surface 7, a valve cap 3 attached to an opening/closing shaft portion (rotating operation unit) 2a of the gate valve 2 can be observed above the around 9 laid in the bottom of the hole 5a of the valve box 5. The valve cap 3 includes a connection portion 6 that is attached to the opening/closing shaft portion 2a as the rotating operation unit for opening and closing the gate valve 2, and a truncated quadrangular pyramid structure portion 4 that has a truncated quadrangular pyramid shape and is formed above the connection portion 6 to be integrated with the connection portion 6. As a result, the truncated quadrangular pyramid structure portion 4 of the valve cap 3 attached to the opening/closing shaft portion 2a of the valve cap 2 is rotated in any direction along a rotation 10 for opening and closing valve such that the gate valve 2 can be closed or opened. The truncated quadrangular pyramid structure portion 4 may have a quadrangular prism shape.

When the lid 8 of the valve box 5 is opened to look in the hole 5a of the valve box 5, the truncated quadrangular pyramid structure portion 4 disposed above the connection portion 6 of the valve cap 3 can be observed.

Here, for example, when water leakage 12 occurs due to a hole or a crack formed by corrosion at a water leakage point 11 of the water pipe 1, water leakage vibration 13 generated by the water leakage 12 is propagated by using the water pipe 1 and water in the water pipe 1 as media, and thus the water leakage vibration 13 is propagated to the truncated quadrangular pyramid structure portion 4 of the valve cap 3 along a Z-axis direction through the opening/closing shaft portion 2a of the gate valve 2 and the connection portion 6 of the valve cap 3. At this time, a frequency of the propagated water leakage vibration 13 is in a low frequency band of 1 kHz or lower as described above regarding the leak sound detection bar.

In addition, a sensor terminal 21 disposed in the hole 5a of the valve box 5 is mounted on a base 23 in an attachment portion 25 including the base 23 and an attachment main body Portion 24, and includes a vibration sensor 27 illustrated in FIG. 2 and described below that is covered with a cylindrical cover 22. That is, the cylindrical cover 22 is disposed on the base 23, and the vibration sensor 27 mounted on the base 23 is disposed in a space covered and sealed with the cover 22.

On the other hand, the attachment main body portion 24 having an L-shape in a plan view is disposed below the base 23. Further, as illustrated in FIG. 2, a side surface magnet (second magnet) 31 is attached to a first inner wall surface 24a of the attachment main body portion 24, and a side surface magnet (third magnet) 32 is attached to a second inner wall surface 24b adjacent to the first inner wall surface 24a. The side surface magnet 31 is screwed to the first inner wall surface 24a of the attachment main body portion 24, and the side surface magnet 32 is screwed to the second inner wall surface 24b of the attachment main body portion 24.

As described above, in Embodiment 1, the sensor terminal 21 functions as the fixing structure for an electronic device.

The sensor terminal 21 is fixed using the magnet by pressing 42 side surfaces thereof while being lowered 41 toward a first side surface 4a and a second side surface 4b which are two side surfaces 4d of the truncated quadrangular pyramid structure portion 4 of the valve cap 3. Therefore, the attachment main body portion 24 of the attachment portion 25 (refer to FIG. 5) of the sensor terminal 21 is fixed using the magnet to the truncated quadrangular pyramid structure portion 4 of the valve cap 3. As a result, the water leakage vibration 13 can be detected by the sensor terminal 21.

In addition, a water leakage detector according to Embodiment 1 includes the sensor terminal 21 including the attachment portion 25 on which the vibration sensor 27 is mounted and the magnets provided in the attachment portion 25, and an antenna unit (transceiver) 29 including an antenna and exchanging information obtained by the vibration sensor 27 (information included in the vibration sensor 27) through the antenna 18. Further, the water leakage detector includes a data collection device 30 as an external processing unit that transmits and receives signals to and from the antenna unit 29 and executes a desired process based on the signals transmitted from the antenna unit 29.

Therefore, vibration data detected by the vibration sensor 27 of the sensor terminal 21 is transmitted to the antenna unit (transceiver) 29 through a signal cable 17, and is further transmitted as a radio signal 16 to the data collection device (external processing unit) 30 provided in a base station installed in an external peripheral environment through the antenna 18 embedded in the antenna unit 29. Likewise, vibration data transmitted from other sensor terminals 21 provided nearby is also transmitted to the data collection device 30 of the base station. As a result, plural pieces of vibration data are compared to each other, a water leakage signal is extracted, and a water leakage position between two positions having a high signal intensity can be calculated and estimated based on, for example, a ratio between the signal intensities of the two positions. That is, with the water leakage detector according to Embodiment 1, a water leakage position of the water pipe 1 constructed underground can be easily and rapidly located.

The electronic device according to Embodiment 1 is a device that is constituted by an electronic circuit including a sensor circuit such as the vibration sensor 27. However, the electronic circuit may be constituted by a sensor circuit such as an acceleration sensor.

Hereinafter, a structure and an assembly procedure of the sensor terminal 21 will be described in detail with reference to FIGS. 2 to 5.

FIG. 2 is a perspective view illustrating an example of the assembly procedure of the sensor terminal illustrated in FIG. 1, and FIG. 3 is a perspective view illustrating an example of a shape of the valve cap of the gate valve (water regulating valve) illustrated in FIG. 1. In addition, FIG. 4 is a perspective view illustrating a state where the sensor terminal illustrated in FIG. 2 is attached to the valve cap, and FIG. 5 is a cross-sectional view illustrating a structure taken along line A-A of FIG. 4.

As illustrated in FIG. 2, the vibration sensor (electronic device) 27 is fixed and electrically connected to a circuit board 28 by soldering or through a socket. On the circuit board 28, a processing circuit of the vibration sensor 27, a signal transmission circuit, a power supply circuit, and the like are also mounted (not illustrated). A battery 26 fixed to a pillar 26a is installed above the circuit board 28, and the sensor terminal 21 can be activated alone by the battery 26. In addition, the circuit board 28 is fixed to the cylindrical metal base 23 by being attached thereto from an upper surface, and the cover 22 that protects the circuit board 28 is fixed to the base 23 through an O-ring or the like (not illustrated) for waterproof and moisture-proof which may be necessary. Specifically, the above fixing is performed by cover fixing holes 22a of the cover 22 and base fixing holes 23a of the base 23 using bolts or the like after mounting 52 the cover.

On the other hand, the L-shaped attachment main body Portion 24 is fixed to a lower surface of the base 23 by being attached 53 from the lower surface using bolts or the like, the attachment main body portion 24 including the side surface magnet 31 provided on the first inner wall surface 24a and the side surface magnet 32 provided on the second inner wall surface 24b. Further, an upper surface magnet (first magnet) 33 is attached to the vicinity of the center of the lower surface of the base 23 using a bolt or the like.

In order to identify, even from above the sensor terminal 21, a direction of the L-shaped attachment main body Portion 24 which is disposed on the lower surface of the sensor terminal 21 inserted into the hole 5a of the valve box 5, it is desired that an attachment direction arrow (mark) 55 indicating an installation direction of the first inner wall surface 24a of the L-shaped attachment main body portion 24 is described or marked on an upper surface of the cover 22 that covers the vibration sensor 27 in the sensor terminal 21. Likewise, by describing or marking an attachment direction arrow (mark) 56 indicating an installation direction of the second inner wall surface 24b of the L-shaped attachment main body portion 24, the direction of the attachment main body portion 24 can be more easily identified. This way, by marking the attachment direction arrow 55 or the attachment direction arrow 56, the direction of the attachment main body portion 24 in the sensor terminal 21 can be easily identified even from above the sensor terminal 21.

As a result, when the sensor terminal 21 is fixed to or released from the valve cap 3, a direction to move the attachment main body portion 24 in the sensor terminal 21 can be recognized even from above the sensor terminal 21.

The attachment direction arrow 55 or the attachment direction arrow 56 may be marked on an upper surface of the vibration sensor 27 itself. In addition, a seal or the like may be attached as the attachment direction arrow 55 or the attachment direction arrow 56.

In addition, in Embodiment 1, the attachment main body portion 24 having an L-shape in a plan view is used. As a result, when the attachment main body portion 24, on which the vibration sensor 27 is mounted, is attached on the truncated quadrangular pyramid structure portion 4 of the valve cap 3, the attachment main body portion 24 can be lowered until the vicinity of the side surfaces 4d of the truncated quadrangular pyramid structure portion 4 of the valve cap 3, and in this state, the attachment main body portion 24 can be fixed using the magnet to the truncated quadrangular pyramid structure portion 4 from the horizontal side of the truncated quadrangular pyramid structure portion 4.

As a result, the attachment main body portion 24 can be simply and accurately fixed using the magnet to the correct position of the truncated quadrangular pyramid structure portion 4. In addition, as the attachment main body portion 24 can be fixed using the magnet to the truncated quadrangular pyramid structure portion 4 from the horizontal side of the truncated quadrangular pyramid structure portion 4, the attachment main body portion 24 can be certainly fixed using the magnet to the two side surfaces 4d.

That is, when the fixing is performed using the magnet from only above the truncated quadrangular pyramid structure portion 4, the attachment main body portion 24 is adsorbed while the attachment main body portion 24 is lowering because magnetic force is strong. As a result, the attachment main body portion 24 may be attached in an inclined state. However, in the case of Embodiment 1, the attachment main body portion 24 can be fixed using the magnet to the truncated quadrangular pyramid structure portion 4 from the horizontal side of the truncated quadrangular pyramid structure portion 4. Therefore, the attachment main body portion 24 can be prevented from being attached in an inclined state.

Next, a shape and a dimension of the valve cap 3 of the gate valve 2 illustrated in FIG. 1 will be described using FIG. 3. In general, a length A of an upper side 61 of the truncated quadrangular pyramid structure portion 4 of the valve cap 3 is 33.5 mm, a length B of a lower side 62 of the truncated quadrangular pyramid structure portion 4 is 38 mm, and a height of the truncated quadrangular pyramid structure portion 4 is 50 mm. Alternatively, the length A of the upper side 61 of the truncated quadrangular pyramid structure portion 4 is 32 mm, the length B of the lower side 62 of the truncated quadrangular pyramid structure portion 4 is 38 mm, and the height H of the truncated quadrangular pyramid structure portion 4 is about 70 mm. It is preferable that an upper surface 4c of the truncated quadrangular pyramid structure portion 4 and a lower surface (not illustrated) opposite to the upper surface 4c has a square shape. Here, the water leakage vibration 13 illustrated in FIG. 1 is propagated to the connection portion 6 of the valve cap 3, and is propagated to the truncated quadrangular pyramid structure portion 4 to occur in the Z-axis direction, that is, an up-down direction as a water leakage vibration direction 14. The vibration in the water leakage vibration direction 14 is detected by the vibration sensor 27 as vibration in a vibration detection direction 15 illustrated in FIG. 2.

Next, an installation structure of the sensor terminal 21 will be described using FIGS. 4 and 5.

First, as illustrated in FIG. 5, a cone angle θ of each of the four side surfaces 4d of the truncated quadrangular pyramid structure portion 4 of the valve cap 3 is $\tan^{-1}((38-33.5)/2/50) \cong 2.5°$ or $\tan^{-1}((38-32)/2/70) \cong 2.5°$ when calculated based on the dimensions A, B, and H illustrated in FIG. 3. The cone angle θ refers to an inclination angle with respect to a vertical surface (surface perpendicular to a horizontal surface) of each of the four side surfaces 4d.

As same as the four side surfaces 4d of the truncated quadrangular pyramid structure portion 4 of the valve cap 3, the first inner wall surface 24a and the second inner wall surface 24b of the L-shaped attachment main body portion 24 are processed to also have an inclination of about 2.5° with respect to the vertical surface so as to correspond to the respective inclined side surfaces 4d of the truncated quadrangular pyramid structure portion 4 of the valve cap 3.

The valve cap 3 is mainly formed of cast iron and has magnetization characteristics. Accordingly, the side surface magnet 31 embedded in the first inner wall surface 24a of the attachment main body portion 24 adsorbs the first side surface 4a of the truncated quadrangular pyramid structure portion 4 illustrated in FIG. 3 using magnetic force thereof such that the first inner wall surface 24a of the attachment main body portion 24 and the first side surface 4a of the truncated quadrangular pyramid structure portion 4 are fixed. Likewise, the side surface magnet 32 embedded in the second inner wall surface 24b of the attachment main body portion 24 adsorbs the second side surface 4b adjacent to the first side surface 4a of the truncated quadrangular pyramid structure portion 4 using magnetic force thereof such that the second inner wall surface 24b of the attachment main body portion 24 and the second side surface 4b of the truncated quadrangular pyramid structure portion 4 are fixed. As a result, the attachment main body portion 24 is fixed to the truncated quadrangular pyramid structure portion 4 using the respective magnets in an X direction and a Y direction.

During the fixing, as described above, by visually recognizing the attachment direction arrow 55 and the attachment direction arrow 56 marked on the upper surface of the cover 22 of the sensor terminal 21, a direction of each of the inner wall surfaces of the L-shaped attachment main body portion 24 and directions of two adjacent side surfaces 4d of the truncated quadrangular pyramid structure portion 4 of the valve cap 3 can be easily made to match with each other.

In addition, in order to endure external force moment such as an earthquake illustrated in FIG. 5, it is desirable that an installation position in a Z direction of each of the side surface magnet 31 embedded in the first inner wall surface 24a of the attachment main body portion 24 and the side surface magnet 32 embedded in the second inner wall surface 24b of the attachment main body portion 24 is in the vicinity of a lower end portion of the attachment main body portion 24 in a −Z-axis direction.

In addition, in the Z direction as the water leakage vibration direction 14 illustrated in FIG. 3, as illustrated in FIG. 5, adsorption force is generated due to magnetic force in the −Z-axis direction of the upper surface magnet 33 between a flat upper surface of the valve cap 3 and the upper surface magnet 33 provided on the lower surface of the base 23. As a result, the upper surface of the valve cap 3 and a curved surface portion of a tip of a positioning pin (projecting portion) 34 are fixed in a form close to a point contact. The positioning pin 34 illustrated in FIG. 5 is attached such that the upper surface magnet 33 is fixed to the lower surface of the base 23, and performs the fixing of the upper surface magnet 33 and the positioning of the base 23 in the up-down direction (Z direction). That is, during the assembly of the sensor terminal 21, the attachment main body portion 24 is fixed using the magnet in a state where the curved surface portion of a tip of the positioning pin 34 abuts against the upper surface 4c of the truncated quadrangular pyramid structure portion 4 of the valve cap 3.

As described above, the fixing structure for an electronic device according to Embodiment 1 includes the vibration sensor 27 as an electronic device, the attachment portion 25 on which the electronic device 27 is mounted and which is detachably attached to the truncated quadrangular pyramid structure portion 4 of the valve cap 3 attached to the opening/closing shaft portion 2a (rotating operation unit) for opening and closing a water regulating valve provided in a water service pipe, and the magnet provided in the attachment portion 25. The truncated quadrangular pyramid structure portion 4 of the valve cap 3 includes the quadrangular upper surface 4c and the four side surfaces 4d connected to the upper surface.

In Embodiment 1, as described above, the case where the attachment portion 25 includes the base 23 and the attachment main body portion 24 has been described. That is, the L-shaped attachment main body portion 24 is disposed below the base 23. Further, the side surface magnet (second magnet) 31 is attached to the first inner wall surface 24a of the attachment main body portion 24, and the side surface magnet (third magnet) 32 is attached to the second inner wall surface 24b adjacent to the first inner wall surface 24a.

In the fixing structure for an electronic device, the attachment main body portion 24 of the attachment portion 25 may be fixed using the magnet to each of the upper surface 4c of the truncated quadrangular pyramid structure portion 4 of the valve cap 3 and at least one side surface 4d among the four side surfaces 4d of the truncated quadrangular pyramid structure portion 4.

This way, the fixing between the attachment main body Portion 24 and the truncated quadrangular pyramid structure portion 4 of the valve cap 3 using the magnet is performed on each of the upper surface 4c of the truncated quadrangular pyramid structure portion 4 and at least one side surface 4d among the four side surfaces 4d. As a result, a fixing strength of the attachment main body portion 24 with respect to the external force moment 71 illustrated in FIG. 5 can be improved. That is, the fixing of the attachment main body Portion 24 to the truncated quadrangular pyramid structure portion 4 using the magnet is performed not only on the upper surface 4c of the truncated quadrangular pyramid structure portion 4 but also on at least one side surface 4d. As a result, moment resistance with respect to the external force moment 71 can be improved, and the attachment main body portion 24 becomes hard to release. In addition, point contact between the upper surface 4c of the truncated quadrangular pyramid structure portion 4 and the positioning pin 34 is secured. Therefore, vibration characteristics can be detected without deterioration.

As in the structure of Embodiment 1 illustrated in FIGS. 4 and 5, the attachment main body portion 24 is fixed using the side surface magnets 31 and 32 to the upper surface 4c of the truncated quadrangular pyramid structure portion 4 and the first side surface 4a and the second side surface 4b adjacent to each other among the four side surfaces 4d of the truncated quadrangular pyramid structure portion 4. As a result, the attachment main body portion 24 is fixed using the magnet to two side surfaces 4d of the truncated quadrangular pyramid structure portion 4. Therefore, the moment resistance can be further improved. In addition, the moment resistance in directions along the first side surface 4a and the second side surface 4b of the truncated quadrangular pyramid structure portion 4, that is, in two axial directions can be improved.

In addition, even in the water leakage detector including the sensor terminal 21 according to Embodiment 1, regarding the fixing of the attachment main body portion 24 to the truncated quadrangular pyramid structure portion 4 of the valve cap 3 using the magnet, moment resistance with respect to the external force moment 71 can be improved, and the attachment main body portion 24 becomes hard to release.

Here, generally in a vibration detection method of the vibration sensor 27, it is verified that there is no problem in vibration transmission at a low frequency of up to about kHz by contact using a probe. In addition, vibration transmission regarding the fixing using the magnet is performed in a wider frequency band of up to about 3 kHz. That is, when the form close to a point contact or the fixing using the magnet on the upper surface of the valve cap 3 can be realized, water leakage vibration can be transmitted in a frequency band of up to about 1 kHz.

In the structure illustrated in FIGS. 4 and 5, when the fixing is performed using the two magnets including the side surface magnet 31 and the side surface magnet 32, the upper surface magnet 33 is not provided, and the positioning pin 34 is not in contact with the upper surface of the valve cap 3, vibration transmission is evaluated. In the result of this evaluation, resonance occurs in the vicinity of a frequency band of 500 to 800 Hz, and transmission characteristics change depending on the frequency.

On the other hand, when the fixing performed using the two magnets including the side surface magnet 31 and the side surface magnet 32, the valve cap 3 is adsorbed using the upper surface magnet 33, and the positioning pin 34 is in contact with the upper surface of the valve cap 3, vibration transmission is evaluated. In the result of this evaluation, transmission characteristics are uniform (signal amplification factor ≅1) with respect to the frequency in the vicinity of a frequency band of 200 to 1000 Hz required for water leakage detection. It can be verified from the above results that the effect of the contact between the upper surface of the valve cap 3 and the positioning pin 34 is high. That is, by bringing the positioning pin 34 and the upper surface 4c of the truncated quadrangular pyramid structure portion 4 of the valve cap 3 into contact with each other, the vibration transmission characteristics of the vibration sensor 27 can be secured.

Here, a guideline of the required adsorption force of the magnet will be described. FIG. 6 is a cross-sectional view illustrating adsorption force of the inner wall surfaces of the attachment main body portion of the sensor terminal illustrated in FIG. 5, and FIG. 7 is a cross-sectional view illustrating adsorption force of the upper surface magnet attached to the base of the sensor terminal illustrated in FIG. 5.

First, according to data, an acceleration generated by the largest earthquake recorded in history is 2.7 G in one direction and is 4.4 G as a vector. It is important that, even when an earthquake equivalent to the above earthquake occurs, the sensor terminal 21 (fixing structure for an electronic device) illustrated in FIG. 5 is not released from the valve cap 3. As illustrated in FIG. 6, assuming that the weight of the sensor terminal 21 (refer to FIG. 5) is kg or less, external force (excitation force) of an earthquake, that is, a tensile strength S with which the base 23 is peeled off from the valve cap 3 can be obtained from the formula "weight of sensor terminal 21×maximum acceleration at time of occurrence of earthquake", and is 1 kg×(2.7 to 4.4)=2.7 to 4.4 kgf (27 to 44 N).

On the other hand, high external force is required to peel off the side surface magnet 31 or the side surface magnet 32 vertically from an adsorption surface. However, in order to shift the side surface magnet 31 or the side surface magnet 32 from the adsorption surface in parallel, only relatively low external force higher than friction is needed. In the friction, shifting force needs to be higher than the external force generated by the above-described earthquake. A frictional coefficient of the surface (the side surface 4d which is a fixed surface of the magnet) of the valve cap 3 formed of cast iron may vary depending on presence or absence of coating and a rusting state, but is about 0.2 to 0.3 when actually measured. Based on normal force N, having an action and reaction relationship with adsorption force J of the side surface magnet 31 illustrated in FIG. 6, and the above-described frictional coefficient, maximum static friction force F can be obtained from "adsorption force (normal force N) of side surface magnet 31 with respect to adsorption surface×frictional coefficient=maximum static friction force F". That is, the external force with which the position of the side surface magnet 31 is shifted and the tensile strength (the excitation force of the earthquake) S can be calculated. In other words, "adsorption force J of side surface magnet 31× frictional coefficient (0.2 to 0.3)>external force of earthquake (2.7 to 4.4 kgf (27 to 44 N))" is satisfied, and the adsorption force J required for the two side surface magnets 31 and 32 can be calculated as a range of 14 to 22 kgf (140 to 220 N).

Regarding the fixing between the attachment main body portion 24 of the sensor terminal 21 and the truncated quadrangular pyramid structure portion 4 of the valve cap 3, by satisfying "adsorption force J of side surface magnet (side surface magnet 32)×frictional coefficient (0.2 to 0.3) >external force of earthquake (2.7 to 4.4 kgf (27 to 44 N))", the side surface magnet 31 (side surface magnet 32) can be prevented from peeling off due to the external force of the earthquake.

In addition, as illustrated in FIG. 7, the upper surface magnet 33 is fixed to the lower surface of the base 23 using the positioning pin 34, and the positioning pin 34 projects downward from the upper surface magnet 33. Therefore, when the attachment main body portion 24 is attached to the truncated quadrangular pyramid structure portion 4, the tip of the positioning pin 34 comes into contact with the truncated quadrangular pyramid structure portion 4 of the valve cap 3. At this time, a clearance 120 between the upper surface 4c of the truncated quadrangular pyramid structure portion 4 and the upper surface magnet 33 corresponding to the projection of the positioning pin 34 is about 0.5 mm, and the upper surface magnet 33 is in non-contact with the upper surface 4c of the truncated quadrangular pyramid structure portion 4.

Specifically, at a position of the lower surface of the attachment main body portion 24 facing the upper surface 4c of the truncated quadrangular pyramid structure portion 4, the positioning pin (projecting portion) 34 is provided so as to fix the upper surface magnet 33. The attachment main body portion 24 is attracted by the magnetic force of the upper surface magnet 33 to be fixed in non-contact with the upper surface 4c of the truncated quadrangular pyramid structure portion 4, in a state where the positioning pin 34 and the upper surface 4c of the truncated quadrangular pyramid structure portion 4 are in contact with each other due to the magnetic force of the upper surface magnet 33. In other words, the positioning pin 34 is interposed between the upper surface magnet 33 and the upper surface 4c of the truncated quadrangular pyramid structure portion 4.

Accordingly, adsorption force U of the upper surface magnet 33 with respect to the upper surface 4c of the truncated quadrangular pyramid structure portion 4 of the valve cap 3 varies depending on the size of the clearance 120 between the upper surface 4c of the truncated quadrangular pyramid structure portion 4 and the upper surface magnet 33, and when the clearance 120 is about 0.5 mm, is reduced to about half. As described above, due to vibration transmission characteristics, it is necessary that the positioning pin 34 is in contact with the truncated quadrangular pyramid structure portion 4 at all times, and one condition is that the adsorption force U is higher than the external force of the earthquake. That is, "adsorption force of upper surface magnet 33×attenuation of non-contact amount of magnet (0.5)>external force of earthquake (2.7 to 4.4 kgf (27 to 44 N))" is satisfied, and the adsorption force U required for the upper surface magnet 33 can be calculated as a range of about 5 to 9 kgf (50 to 90 N).

When the distance of the clearance 120 between the upper surface magnet 33 and the upper surface 4c of the truncated quadrangular pyramid structure portion 4 is represented by D as illustrated in FIG. 7, regarding the fixing between the attachment main body portion 24 of the sensor terminal 21 and the upper surface 4c of the truncated quadrangular pyramid structure portion 4 of the valve cap 3, "adsorption force U of upper surface magnet 33×attenuation coefficient (coefficient corresponding to distance D)>external force of earthquake (2.7 to 4.4 kgf (27 to 44 N)" is satisfied. By setting this relationship, the upper surface magnet 33 can be prevented from peeling off due to the external force of the earthquake.

In summary, the adsorption force of the side surface magnets 31 and 32 is necessary in order to prevent peeling when the external force of the earthquake is 2.7 to 4.4 kgf (27 to 44 N), and then the adsorption force of the upper surface magnet 33 is also necessary in order to prevent the contact of the positioning pin 34 from being released from the viewpoint of vibration transmission characteristics. On the other hand, in order to remove the sensor terminal 21 from the valve box 5, it is necessary to pull the sensor terminal 21 out to the +Z axis direction(upward), and it is necessary that the pulling force is 5.4 to 8.8 kgf (54 to 88 N) which is the sum of the adsorption force of the side surface magnets 31 and 32 and the adsorption force of the upper surface magnet 33. In general, the weight that can be carried by a single person is about 10 to 20 kg. Therefore, a single worker can pull out the sensor terminal 21 against the adsorption force of the magnet. That is, with the sensor terminal 21 as the fixing structure for an electronic device according to Embodiment 1, the installation of the sensor terminal 21 using the magnet, the fixing strength that can endure an earthquake, and the pulling and removal by a single worker can be realized.

In addition, not only at a quiet time but also after an earthquake, an effect of obtaining flat vibration transmission characteristics in a frequency range of up to 1 kHz required for water leakage detection can be obtained.

Further, the side surface magnet 31 embedded in the first inner wall surface 24a of the L-shaped attachment main body portion 24, the side surface magnet 32 embedded in the second inner wall surface 24b of the L-shaped attachment main body portion 24, and the upper surface magnet 33 or the positioning pin 34 are disposed on three surfaces adjacent to each other. Therefore, in principle, the three surfaces can come into contact with the valve cap 3 even when there is a variation in external dimension, a variation in processed dimension, or a surface scratch. Therefore, even when there is a difference in the shape of the valve cap 3, an effect of stably performing the fixing using the magnet can also be obtained.

Further, the side surface magnet 31 embedded in the first inner wall surface 24a of the attachment main body portion 24 and the side surface magnet 32 embedded in the second inner wall surface 24b are disposed on wall surfaces adjacent to each other. Therefore, there is also an advantageous effect in that the attachment main body portion 24 can be made to approach the valve cap 3 from one wall surface and can be adsorbed thereto using magnetic force. In addition, when removing the L-shaped attachment main body portion 24, the adsorption force of the magnet can be weakened by inclining the entire sensor terminal 21 in a direction opposite to the attachment main body portion 24. Therefore, by performing an operation of removing the attachment main body portion 24 in the inclined state instead of simply pulling out the attachment main body portion 24, there is also an advantageous effect in that the attachment main body portion 24 can be released from the truncated quadrangular pyramid structure portion 4 with small force. By referring to the attachment direction arrows (marks) 55 and 56 illustrated in FIG. 2 during the removal, a direction in which the attachment main body portion 24 can be released with small force can be specified. For example, when the sensor terminal 21 is inclined in a direction along or opposite to the attachment direction arrows (marks) 55 and 56, the entire sensor terminal 21 is inclined in the direction opposite to the attachment main body portion 24, and thus the attachment main body portion 24 can be released with small force. In order to identify, even from above the sensor terminal 21, the direction of the L-shaped attachment main body portion 24 which is disposed on the lower surface of the sensor terminal 21 inserted into the hole 5a of the valve box 5, it is desired that removal direction arrows (marks) 55 and 56 indicating a direction in which the L-shaped attachment main body portion 24 is removed is described or marked on the upper surface of the cover 22 that covers the vibration sensor 27 in the sensor terminal 21. The removal direction may be any direction in which the attachment main body portion 24 can be released from the truncated quadrangular pyramid structure portion 4 with small force such that the operation of removing the attachment main body portion 24 can be performed in the inclined state instead of simply removing the attachment main body portion 24.

With the fixing structure for an electronic device according to Embodiment 1, the moment resistance to the external force moment 71 can be improved. Therefore, even when high excitation is applied due to an earthquake or the like, the installation position of the attachment main body portion 24 on which the vibration sensor 27 is mounted can be prevented from being shifted, and the fixing of the attachment main body portion 24 using the magnet can be prevented from being released. Further, the simple installation structure using the magnet can be realized. That is, even when high excitation is applied due to an earthquake or the like, the sensor terminal 21 including a sensor such as the vibration sensor 27 can be fixed stably for a long period of time, and the vibration transmission characteristics of the vibration sensor 27 can be secured.

Embodiment 2

FIG. 8 is a cross-sectional view illustrating an example of a structure of a fixing structure for an electronic device according to Embodiment 2 of the invention in which one side surface magnet is smaller than another side surface magnet. That is, when the structure according to Embodiment 2 is compared to the structure of FIG. 5, the side surface magnet 31 embedded in the first inner wall surface 24a of the L-shaped attachment main body portion 24 is smaller than the side surface magnet 32 embedded in the second inner wall surface 24b. That is, a small side surface magnet 35 having a smaller size is used instead of the side surface magnet 31.

Therefore, magnetic force of the small side surface magnet 35 (side surface magnet 31) embedded in the first inner wall surface 24a of the attachment main body portion 24 can be set to be smaller than magnetic force of the side surface magnet 32 embedded in the second inner wall surface 24b. As a result, when a removal operation 72 is performed in an inclined state in the X-axis direction, an effect of easily removing the sensor terminal 21 with the side surface magnet 32 as a rotation supporting point can be obtained. In addition, when the removal operation 72 is performed clockwise in an inclined state in the X-axis direction, an effect of stably performing the inclination for removing the sensor terminal 21 with the positioning pin 34 as a rotation supporting point can also be obtained.

Embodiment 3

FIG. 9 is a cross-sectional view illustrating an example of a structure of a fixing structure for an electronic device according to Embodiment 3 of the invention, in which one side surface magnet is removed. That is, when the structure according to Embodiment 3 is compared to the structure of FIG. 5, the side surface magnet 31 embedded in the first inner wall surface 24a of the L-shaped attachment main body portion 24 is removed, and the side surface magnet 32 embedded in the second inner wall surface 24b remains.

As a result, there is an advantageous effect during the attachment of the sensor terminal 21 in that the sensor terminal 21 can be fixed using the side surface magnet 32 embedded in the second inner wall surface 24b by adjusting a rotation direction around the Z-axis while bringing the sensor terminal 21 into contact with the first inner wall surface 24a of the attachment main body portion 24 where no magnet is provided. Further, when a removal operation 72 is performed in an inclined state in the X-axis direction, an effect of easily removing the sensor terminal 21 with the side surface magnet 32 as a rotation supporting point can be obtained. In addition, when the removal operation 72 is performed clockwise in an inclined state in the X-axis direction, an effect of stably performing the inclination for removing the sensor terminal 21 with the positioning pin 34 as a rotation supporting point can also be obtained.

Embodiment 4

FIG. 10 is a perspective view illustrating a shape of a valve cap for a soft seal gate valve according to Embodiment of the invention. FIG. 11 is a cross-sectional view illustrating an example of a fixing structure for an electronic device according to Embodiment 4 of the invention in which the positioning pin of the upper surface is removed and the size of a magnet is increased. In a valve cap 3a for a soft seal gate valve illustrated in FIG. 10, a cast projecting portion 81 representing a projecting character s is formed on the upper surface 4c of the truncated quadrangular pyramid structure portion 4 so as to recognize the soft seal valve at first sight. As compared to the valve cap 3 illustrated in FIG. 3, the adsorption area of the magnet and the contact area of the positioning pin 34 can be reduced.

Therefore, the positioning pin 34 is not provided as illustrated in FIG. 5, and a large upper surface magnet 36 having a large area is fixed to the lower surface in the vicinity of the center of the base 23 as illustrated in FIG. 11. Thus, the contact area of the magnet is increased, and the cast projecting portion 81 is directly fixed using the magnet. As a result, even in the valve cap 3a for a soft seal valve, a decrease in magnetic force caused by the formation of the cast projecting portion 81 can be prevented, and the attachment main body portion 24 can be fixed using magnetic force of the side surface magnet 31, the side surface magnet 32, and the large upper surface magnet 36. In addition, since the positioning pin 34 is not used, the attachment of the sensor terminal 21 in an inclined state can be prevented.

Here, the transmission of the water leakage vibration 13 illustrated in FIG. 1 can be performed in a wider frequency range up to a high frequency in the case of the fixing using the magnet as compared to the point contact of a probe as described above, and thus it is needless to say that there is no problem.

In the valve cap 3a for a soft seal gate valve, the positioning pin 34 is not used. Therefore, as illustrated in FIG. 11, the upper surface magnet 33 directly adsorbs the cast projecting portion 81 of the upper surface 4c of the truncated quadrangular pyramid structure portion 4.

Accordingly, regarding the setting of the adsorption force of the large upper surface magnet 36, one condition is that the adsorption force U of the large upper surface magnet 36 is higher than the external force of the earthquake (refer to FIG. 7). That is, "adsorption force U of large upper surface magnet 36>external force of earthquake (2.7 to 4.4 kgf (27 to 44 N))" is satisfied.

Regarding the fixing of the sensor terminal 21, the case where the positioning pin 34 is not used to fix the sensor terminal 21 to the valve cap 3a for a soft seal gate valve has been described. However, the positioning pin 34 may also be used to fix the sensor terminal 21 to the valve cap 3a for a soft seal gate valve.

Embodiment 5

FIG. 12 is a perspective view illustrating an example of a shape of an extension bar connected to the valve cap according to Embodiment 5 of the invention. FIG. 13 is a cross-sectional view illustrating an example of a structure of a fixing structure for an electronic device according to Embodiment 5 of the invention in which the positioning pin of the upper surface is removed, the size of a magnet is increased, and positions of side surface magnets are shifted upward.

As compared to the valve cap 3 illustrated in FIG. 3, Embodiment 5 is made as a countermeasure against a case where the hole 5a of the valve box 5 illustrated in FIG. 1 is deep. As illustrated in FIG. 12, an extension bar connection portion 91 of an extension bar (extension member) 92 is connected on the valve cap 3 to improve operability of opening and closing the valve. In this case, it is necessary to fix the sensor terminal 21 to an extension bar cap (knob) 93 formed of iron or cast iron.

Specifically, in the sensor terminal 21 according to Embodiment 5, as illustrated in FIG. 12, the extension bar (extension member) 92 that is attached to the truncated quadrangular pyramid structure portion 4 of the valve cap 3 through the extension bar connection portion 91 is provided. The attachment main body portion 24 having an L-shape in a plan view illustrated in FIG. 13 is fixed using the magnet to each of an upper portion of the extension bar cap (knob) 93 included in the extension bar 92 and a portion of a side surface of the extension bar cap 93 that is most prominent in a horizontal direction (X-axis direction).

Unlike the truncated quadrangular pyramid structure portion 4 of the valve cap 3, it is necessary that a shape of the extension bar cap 93 corresponds to the inclination of the extension bar 92. Therefore, the side surface of the extension bar cap 93 may be formed to be curved. In this case, a position that can be adsorbed using the magnet is limited. Accordingly, as illustrated in FIG. 13, the height of each of the side surface magnet 31 embedded in the first inner wall surface 24a of the attachment main body portion 24 and the side surface magnet 32 embedded in the second inner wall surface 24b of the attachment main body portion 24 is shifted upward as compared to the structure illustrated in FIG. 5 such that the magnet can be adsorbed on the most prominent surface of the side surface of the extension bar cap 93 (the portion of the side surface of the extension bar cap 93 that is most prominent in the horizontal direction (X-axis direction).

That is, in the structure of the sensor terminal 21 illustrated in FIG. 13, the side surface magnet 31 is shifted 45a upward and the side surface magnet 32 is shifted 45b upward according to the side surface shape of the extension bar cap 93 such that the height positions of the side surface magnet 31 and the side surface magnet 32 are higher than those in the structure of the sensor terminal 21 illustrated FIG. 5. Thus, even when the side surface of the extension bar cap 93 is formed to be curved, the adsorption force of each of the side surface magnets 31 and 32 can be secured. As a result, even when the hole 5a of the valve box 5 illustrated in FIG. 1 is deep, by attaching the extension bar 92 and the extension bar cap 93 to the sensor terminal 21, the attachment and removal of the sensor terminal 21 to and from the valve cap 3 can be easily performed.

Embodiment 6

FIG. 14 is a cross-sectional view illustrating an example of a structure of a fixing structure of a sensor terminal according to Embodiment 6 of the invention in which portions to which a side surface magnet is attached face each other in the form of two parallel lines.

In Embodiments 1 to 5 described above, the shape of the magnet attachment main body portion 24 below the base 23 is an h-shape. However, in Embodiment 6, an attachment main body portion 101 having a shape in which inner wall surfaces face each other in the form of two parallel lines is used instead of the attachment main body portion 24 illustrated in FIG. 5. In this case, a magnet is embedded only in a first inner wall surface 102a which is one inner side surface of the attachment main body portion 101. That is, a side surface magnet 103 is embedded in the first inner wall surface 102a of the attachment main body portion 101.

Specifically, the attachment portion 25 of the sensor terminal 21 includes the attachment main body portion 101 attached to the truncated quadrangular pyramid structure portion 4 of the valve cap 3. Further, the attachment main body portion 101 includes the first inner wall surface 102a and a second inner wall surface 102b that are two inner wall surfaces that face each of two side surfaces 4d facing each other among the four side surfaces 4d of the truncated quadrangular pyramid structure portion 4, and is fixed using the upper surface magnet (first magnet) 33 to the upper surface 4c of the truncated quadrangular pyramid structure Portion 4. Further, any one of the first inner wall surface 102a and the second inner wall surface 102b as the two inner wall surfaces is fixed using the side surface magnet (second magnet) 103 to the side surface 4d facing the inner wall surface.

In the sensor terminal 21 illustrated in FIG. 14, the attachment main body portion 101 includes a first wall portion 101a including the first inner wall surface 102a that is one inner wall surface among the first wall portion 102a and the second inner wall surface 102b, and a second wall portion 101b including the second inner wall surface 102b that is another inner wall surface among the first inner wall portion 102a and the second inner wall surface 102b. The first wall portion 101a and the second wall portion 101b are formed to be integrated with each other.

In the attachment main body portion 101 of the sensor terminal 21 illustrated in FIG. 14, the first wall portion 101a and the second wall portion 101b provided to face the first wall portion 101a are formed to be integrated with each other. As a result, the position accuracy of the first wall portion 101a and the second wall portion 101b that are attached to the base 23 can be improved. In addition, the first wall portion 101a and the second wall portion 101b can be easily attached to the base 23.

Further, the strength to the external force moment 71 (refer to FIG. 5) in the horizontal direction can be improved. That is, when the external force moment 71 in the horizontal direction is applied such that the magnet is about to be released, the wall portion on the side facing the magnet functions as a support such that the position of the attachment main body portion 101 can return to the original position.

The magnet is not provided on the second inner wall surface 102b of the attachment main body portion 101 disposed at the facing position, and a clearance 104 of several millimeters or less is formed between the second inner wall surface 102b and the truncated quadrangular pyramid structure portion 4.

The above structure is configured to obtain an effect of preventing the situation that only the side surface 4d of the truncated quadrangular pyramid structure portion 4 of the valve cap 3 is in contact with the sensor terminal 21 and the positioning pin 34 is not in contact with the upper surface 4c of the truncated quadrangular pyramid structure portion 4 of the valve cap 3 due to a dimensional variation or a surface scratch of the valve cap 3 where the sensor terminal 21 is provided. When the sensor terminal 21 is removed, the sensor terminal 21 can be easily removed with small force by performing the removal operation 72 in the Y-axis direction (depth direction of the drawing) having no form of two parallel lines.

In the sensor terminal 21 according to Embodiment 6, the first wall portion 101a and the second wall portion 101b of the attachment main body portion 101 are not necessarily formed to be integrated with each other. The first wall Portion 101a and the second wall portion 101b may be formed separately, or may be attached to the base 23 individually.

Embodiment 7

FIG. 15 is a cross-sectional view illustrating an example of a structure of a fixing structure for an electronic device according to Embodiment 7 of the invention in which portions to which side surface magnets are attached are formed to surround the four side surfaces.

When Embodiment 7 is compared to Embodiment 6, an attachment main body portion 111 that surrounds the four side surfaces in a hollow rectangular shape as illustrated in FIG. 15 is used instead of the attachment main body portion 101 disposed below the base 23. That is, the attachment main body portion 111 includes a first inner wall surface 112a, a second inner wall surface 112b, a third inner wall surface 112c, and a fourth inner wall surface so as to surround the four side surfaces 4d of the truncated quadrangular pyramid structure portion 4 of the valve cap 3. However, in the sensor terminal 21 illustrated in FIG. 15, the fourth inner wall surface is omitted in order to easily understand the structure.

Specifically, the attachment main body portion 111 surrounds the four side surfaces 4d of the truncated quadrangular pyramid structure portion 4 and includes the four inner wall surfaces (the first inner wall surface 112a, the second inner wall surface 112b, the third inner wall surface 112c, and the fourth inner wall surface) that face the four side surfaces 4d respectively. Further, the attachment main body portion 111 is fixed using the upper surface magnet (first magnet) 33 to the upper surface 4c of the truncated quadrangular pyramid structure portion 4, and the first inner wall surface 112a among the four inner wall surfaces is fixed using a side surface magnet (second magnet) 113a to the first side surface 4a illustrated in FIG. 3 facing the first inner wall surface 112a. Further, in the attachment main body portion 111, the second inner wall surface 112b adjacent to the first inner wall surface 112a is fixed using a side surface magnet (third magnet) 113b to the second side surface 4b illustrated in FIG. 3 adjacent to the first side surface 4a.

That is, the side surface magnet 113a is embedded in the first inner wall surface 112a of the facing type attachment main body portion 111, and the side surface magnet 113b is embedded in the second inner wall surface 112b adjacent to the first inner wall surface 112a. No magnet is provided on the third inner wall surface 112c facing the first inner wall surface 112a, and a clearance 114 of several millimeters or less is provided between the third inner wall surface 112c and the side surface 4d of the truncated quadrangular pyramid structure portion 4. The above structure is configured to obtain an effect of preventing the situation tha only the side surface 4d of the truncated quadrangular pyramid structure portion 4 of the valve cap is in contact with the sensor terminal 21 and the positioning pin 34 is not in contact with the upper surface 4c of the truncated quadrangular pyramid structure portion 4 of the valve cap 3 due to a dimensional variation or a surface scratch of the valve cap 3 where the sensor terminal 21 is provided.

In the structure of the sensor terminal 21 illustrated in FIG. 15, an effect close to the effect of the L-shaped attachment main body portion 24 illustrated in FIG. 5 can be obtained. Further, since the four side surfaces 4d of the truncated quadrangular pyramid structure portion 4 are surrounded by the four inner wall surfaces, the inclination or release of the sensor terminal 21 caused by an earthquake or the like can be further reduced. That is, even when the external force moment 71 illustrated in FIG. 5 is applied, the inclination of the sensor terminal 21 can be prevented.

The invention is not limited to the embodiments and includes various modification examples. For example, the embodiments have been described in detail in order to easily describe the invention, and the invention is not necessarily limited to those including all the configurations described above.

In addition, a part of the configuration of one embodiment can be replaced with the configuration of another embodiment. Further, the configuration of one embodiment can be added to the configuration of another embodiment. Also, addition, deletion, and replacement of another configuration can be made for a part of the configuration of each of the embodiments. Each member and a relative size illustrated in the drawings are simplified and idealized to easily understand the invention, and have a more complicated shape in practice.

For example, in Embodiment 1 described above, the case where the sensor terminal 21 is attached to the valve cap of the water pipe constructed underground has been described.

However, the sensor terminal 21 may be attached to, for example, a water pipe on the ground or a water pipe provided in a utility tunnel.

REFERENCE SIGNS LIST

1: water pipe (pipe)
2: gate valve (water regulating valve)
2a: opening/closing shaft portion (rotating operation unit)
3, 3a: valve cap
4: truncated quadrangular pyramid structure portion
4a: first side surface
4b: second side surface
4c: upper surface
4d: side surface
5: valve box
5a: hole
6: connection portion
7: ground surface
8: lid
9: ground
10: rotation for opening and closing valve
11: water leakage point
12: water leakage
13: water leakage vibration
14: water leakage vibration direction
15: vibration detection direction
16: radio signal
17: signal cable
18: antenna
21: sensor terminal
22: cover
22a: cover fixing hole
23: base
23a: base fixing hole
24: attachment main body portion
24a: first inner wall surface
24b: second inner wall surface
25: attachment portion
26: battery
26a: pillar
27: vibration sensor (electronic device)
28: circuit board
29: antenna unit (transceiver)
30: data collection device (external processing unit)
31: side surface magnet (second magnet)
32: side surface magnet (third magnet)
33: upper surface magnet (first magnet)
34: positioning pin (projecting portion)
35: small side surface magnet
36: large upper surface magnet
41: lowering
42: pressing side surfaces
45a, 45b: shifting upward
51: attaching from upper surface
52: mounting cover
53: attaching from lower surface
55: attachment direction arrow (mark)
56: attachment direction arrow (mark)
61: upper side
62: lower side
71: external force moment
72: removal operation
81: cast projecting portion
91: extension bar connection portion
92: extension bar (extension member)
93: extension bar cap (knob)
101: attachment main body portion
101a: first wall portion
101b: second wall portion
102a: first inner wall surface (inner wall surface)
102b: second inner wall surface (inner wall surface)
103: side surface magnet (second magnet)
104: clearance
111: attachment main body portion
112a: first inner wall surface
112b: second inner wall surface
112c: third inner wall surface
113a: side surface magnet (second magnet)
113b: side surface magnet (third magnet)
114: clearance
120: clearance

The invention claimed is:

1. A fixing structure for an electronic device comprising:
an electronic device;
an attachment portion on which the electronic device is mounted and which is detachably attached to a truncated quadrangular pyramid structure portion of a valve cap attached to a rotating operation unit for opening and closing a water regulating valve provided in a water service pipe; and
a plurality of magnets that is provided in the attachment portion, wherein
the truncated quadrangular pyramid structure portion includes a quadrangular upper surface and four side surfaces connected to the upper surface, and
the attachment portion is fixed using the plurality of magnets, one of the magnets attached to each of the upper surface of the truncated quadrangular pyramid structure portion and at least one side surface among the four side surfaces of the truncated quadrangular pyramid structure portion.

2. The fixing structure for an electronic device according to claim 1,
wherein the attachment portion is fixed using the plurality of magnets, one of the magnets attached to each of the upper surface of the truncated quadrangular pyramid structure portion and adjacent two side surfaces among the four side surfaces of the truncated quadrangular pyramid structure portion.

3. The fixing structure for an electronic device according to claim 2, wherein
the plurality of magnets comprises a first, a second and a third magnet,
the attachment portion includes a base on which the electronic device is mounted and an attachment main body portion that is attached to the truncated quadrangular pyramid structure portion,
the attachment main body portion is formed in an L-shape in a plan view and includes a first inner wall surface and a second inner wall surface adjacent to the first inner wall surface,
the base is fixed using the first magnet to the upper surface of the truncated quadrangular pyramid structure portion, and
in the attachment main body portion, the first inner wall surface is fixed using the second magnet to a first side surface among the four side surfaces of the truncated quadrangular pyramid structure portion and the second inner wall surface is fixed using the third magnet to a second side surface adjacent to the first side surface.

4. The fixing structure for an electronic device according to claim 1, wherein the plurality of magnets comprises a first and a second magnet, the attachment portion includes two inner wall surfaces that face each of two side surfaces facing each other among the four side surfaces of the truncated quadrangular pyramid structure portion and is fixed using the first magnet to the upper surface of the truncated quadrangular pyramid structure portion and one inner wall surface among the two inner wall surfaces is fixed using the second magnet to the side surface facing the inner wall surface.

5. The fixing structure for an electronic device according to claim 4, wherein the attachment portion includes an attachment main body portion that is attached to the truncated quadrangular pyramid structure portion, the attachment main body portion includes a first wall portion that includes one inner wall surface among the two inner wall surfaces and a second wall portion that includes another inner wall surface among the two inner wall surfaces, and the first wall portion and the second wall portion are formed to be integrated with each other.

6. The fixing structure for an electronic device according to claim 1, wherein the plurality of magnets comprises a first, a second and a third magnet, the attachment portion surrounds the four side surfaces of the truncated quadrangular pyramid structure portion and includes four inner wall surfaces that face each of the four side surfaces, and further, the attachment portion is fixed using the first magnet to the upper surface of the truncated quadrangular pyramid structure portion, the first inner wall surface among the four inner wall surfaces is fixed using the second magnet to a first side surface facing the first inner wall surface, and a second inner wall surface adjacent to the first inner wall surface is fixed using the third magnet to a second side surface adjacent to the first side surface.

7. The fixing structure for an electronic device according to claim 1, further comprising:

an extension member that is attached to the truncated quadrangular pyramid structure portion of the valve cap, wherein the attachment portion is fixed using the plurality of magnets, one of the magnets attached to each of an upper portion of a knob included in the extension member and a portion of a side surface of the knob that is most prominent in a horizontal direction.

8. The fixing structure for an electronic device according to claim 1, wherein a projecting portion is provided at a position of the attachment portion that faces the upper surface of the truncated quadrangular pyramid structure portion, and the attachment portion is fixed in non-contact with the upper surface of the truncated quadrangular pyramid structure portion using magnetic force of the plurality of magnets in a state where the projecting portion and the upper surface of the truncated quadrangular pyramid structure portion are in contact with each other using the plurality of magnets.

9. The fixing structure for an electronic device according to claim 1, wherein regarding the fixing between the attachment portion and the truncated quadrangular pyramid structure portion, a value obtained by multiplying adsorption force of one of the plurality of magnets fixed to the side surface of the truncated quadrangular pyramid structure portion by a frictional coefficient of a fixed surface of the one of the plurality of magnets is set to be higher than a value obtained by multiplying a weight of the fixing structure for an electronic device by a maximum acceleration at the time of occurrence of an earthquake.

10. The fixing structure for an electronic device according to claim 1, wherein regarding the fixing between the attachment portion and the truncated quadrangular pyramid structure portion, adsorption force of one of the plurality of magnets fixed to the upper surface of the truncated quadrangular pyramid structure portion is set to be higher than a value obtained by multiplying a weight of the fixing structure for an electronic device by a maximum acceleration at the time of occurrence of an earthquake by a coefficient corresponding to distance between the one of the plurality of magnets and the upper surface of the truncated quadrangular pyramid structure portion.

11. The fixing structure for an electronic device according to claim 1, wherein the electronic device is constituted by an electronic circuit including an acceleration sensor or a vibration sensor.

12. The fixing structure for an electronic device according to claim 1, wherein a mark for identifying a direction of one of the plurality of magnets to be fixed to the side surface of the truncated quadrangular pyramid structure portion is formed on an upper surface of the electronic device or an upper surface of a cover that covers the electronic device.

13. A water leakage detector comprising:

an electronic device;

an attachment portion on which the electronic device is mounted and that is detachably attached to a truncated quadrangular pyramid structure portion of a valve cap attached to a rotating operation unit for opening and closing a water regulating valve provided in a water service pipe;

a plurality of magnets that is provided in the attachment portion;

a transceiver that includes an antenna and exchanges information included in the electronic device through the antenna; and an external processing unit that transmits and receives signals to and from the transceiver and executes a process based on the signals transmitted from the transceiver, wherein the truncated quadrangular pyramid structure portion includes a quadrangular upper surface and four side surfaces connected to the upper surface, and the attachment portion is fixed using the plurality of magnets, one of the magnets attached to each of the upper surface of the truncated quadrangular pyramid structure portion and at least one side surface among the four side surfaces of the truncated quadrangular pyramid structure portion.

14. The water leakage detector according to claim 13 wherein the attachment portion is fixed using the plurality of magnets, one of the magnets attached to each of the upper surface of the truncated quadrangular pyramid structure portion and adjacent two side surfaces among the four side surfaces of the truncated quadrangular pyramid structure portion.

15. The water leakage detector according to claim 14,
wherein the plurality of magnets comprises a first, a second and a third magnet,
the attachment portion includes a base on which the electronic device is mounted and an attachment main body portion that is attached to the truncated quadrangular pyramid structure portion,
the attachment main body portion is formed in an L-shape in a plan view and includes a first inner wall surface and a second inner wall surface adjacent to the first inner wall surface,
the base is fixed using the first magnet to the upper surface of the truncated quadrangular pyramid structure portion, and
in the attachment main body portion, the first inner wall surface is fixed using the second magnet to a first side surface among the four side surfaces of the truncated quadrangular pyramid structure portion and the second inner wall surface is fixed using the third magnet to a second side surface adjacent to the first side surface.

* * * * *